(12) United States Patent
Latham et al.

(10) Patent No.: US 12,251,858 B2
(45) Date of Patent: Mar. 18, 2025

(54) METHOD AND SYSTEMS FOR COMPOSITE MOLDING

(71) Applicant: GM GLOBAL TECHNOLOGY OPERATIONS LLC, Detroit, MI (US)

(72) Inventors: Gary Latham, South Lyon, MI (US); Jeffrey G. Price, Huntersville, NC (US); Andrew Thomas Cunningham, Royal Oak, MI (US); Thomas Curtis, Royal Oak, MI (US); Adam Golembeski, Charlotte, NC (US); Patrick J Eding, Fremont, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 18/181,684

(22) Filed: Mar. 10, 2023

(65) Prior Publication Data
US 2024/0300149 A1 Sep. 12, 2024

(51) Int. Cl.
*B29C 33/40* (2006.01)
*B29C 33/38* (2006.01)
*B33Y 80/00* (2015.01)
*B29C 70/30* (2006.01)

(52) U.S. Cl.
CPC .......... *B29C 33/40* (2013.01); *B29C 33/3842* (2013.01); *B33Y 80/00* (2014.12); *B29C 70/30* (2013.01)

(58) Field of Classification Search
None
See application file for complete search history.

(56) References Cited

U.S. PATENT DOCUMENTS

| | | | |
|---|---|---|---|
| 5,775,402 A | 7/1998 | Sachs et al. | |
| 6,440,566 B1* | 8/2002 | Maligie | B32B 27/36 427/508 |
| 2006/0175730 A1* | 8/2006 | Merkel | B29C 33/505 264/324 |
| 2015/0368418 A1* | 12/2015 | Wilken | C09J 7/401 427/535 |

FOREIGN PATENT DOCUMENTS

DE 102022126474 A1 8/2023

* cited by examiner

*Primary Examiner* — Yung-Sheng M Tsui
(74) *Attorney, Agent, or Firm* — Lorenz & Kopf LLP

(57) ABSTRACT

A method and system for composite molding, and the method includes additively manufacturing a mold shell that includes a part forming cavity. The method includes filling at least a portion of the mold shell with a strengthening agent. The method includes hardening the strengthening agent to form a mold, and laying-up a composite material on the part forming cavity. The method includes curing the mold to form a composite part.

20 Claims, 14 Drawing Sheets

METHOD AND SYSTEMS FOR COMPOSITE MOLDING

INTRODUCTION

The technical field generally relates to method and systems for composite molding, and more particularly relates to method and systems for composite molding employing an additively manufactured polymer-based mold.

Polymer-based composite materials, such as carbon fiber, may be used to form various parts. In order to form a part from a composite material, a mold with a lay-up of the composite material is cured by heating to a predetermined temperature and pressure. The molds may be formed out of metal, metal alloy or foam that is coated with a mold shell agent before lay-up of the composite material to withstand the temperature and pressure required to cure the composite material. In certain instances, it may be difficult to manufacture a metal, metal alloy or foam mold to include the desired features for the composite material part, which results in additional processing steps being required after the molding of the composite material part. In addition, in certain instances, additional processing steps, such as sanding or the like, may be required to form the mold with a desired surface finish for the composite material part.

Accordingly, it is desirable to provide a method and systems for composite molding, which enables the formation of a composite mold and a composite part with few, if any, additional processing steps after molding. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a method for composite molding. The method includes additively manufacturing a mold shell that includes a part forming cavity, and filling at least a portion of the mold shell with a strengthening agent. The method includes hardening the strengthening agent to form a mold, and laying-up a composite material on the part forming cavity. The method includes curing the mold to form a composite part.

The additively manufacturing the mold shell further includes additively manufacturing the mold shell to include at least one mold reinforcement structure that cooperates with a side of the part forming cavity to define at least one chamber for filling with the strengthening agent. The additively manufacturing the mold shell further includes additively manufacturing the mold shell to include a first mold half and a second mold half, and each of the first mold half and the second mold half include at least one chamber. The filling at least the portion of the mold shell includes filling the at least one chamber associated with the first mold half with the strengthening agent and filling the at least one chamber associated with the second mold half with the strengthening agent. The additively manufacturing of the first mold half and the second mold half further includes additively manufacturing at least one mold assembly structure into at least one of the first mold half and the second mold half. The additively manufacturing the mold shell further includes additively manufacturing the mold shell to include a conformal system proximate the part forming cavity. The conformal system is a conformal tube system defined on a side of the part forming cavity. The filling at least the portion of the mold shell with the strengthening agent further includes filling at least the portion of the mold shell with one of an epoxy, a resin, a cast silicone, and a urethane, and the hardening the strengthening agent includes curing the one of the epoxy, the resin, the cast silicone, and the urethane. The additively manufacturing the mold shell further includes additively manufacturing the mold shell from a polymer-based material. The additively manufacturing the mold shell further includes additively manufacturing the mold shell such that a cavity wall of the part forming cavity has a variable wall thickness.

Further provided is a system for composite molding. The system includes an additively manufactured mold shell composed of a polymer-based material that includes a part forming cavity and at least one reinforcing structure. The at least one reinforcing structure cooperates with a side of the part forming cavity to form at least one chamber. A strengthening agent is disposed within the at least one chamber. The strengthening agent is an epoxy, a resin, a cast silicone, or a urethane. The additively manufactured mold shell includes a conformal system defined on the side of the part forming cavity. The conformal system includes an inlet configured to receive a heated or a cooled fluid and an outlet configured to remove the heated or the cooled fluid from the conformal system.

Also provided is a method for composite molding. The method includes additively manufacturing a mold shell from a polymer-based material that includes a part forming cavity and at least one reinforcement structure. The part forming cavity includes a cavity wall having a first side opposite a second side, and the second side cooperates with the at least one reinforcement structure to define at least one chamber. The method includes filling the at least one chamber with a strengthening agent, and hardening the strengthening agent to form a mold. The method includes laying-up a composite material on the first side of the part forming cavity, and curing the mold to form a composite part.

The additively manufacturing the mold shell further includes additively manufacturing the mold shell to include a first mold half and a second mold half, and each of the first mold half and the second mold half include the at least one chamber. The filling the at least one chamber includes filling the at least one chamber associated with the first mold half with the strengthening agent and filling the at least one chamber associated with the second mold half with the strengthening agent. The additively manufacturing of the first mold half and the second mold half further includes additively manufacturing at least one mold assembly structure into at least one of the first mold half and the second mold half. The additively manufacturing the mold shell further includes additively manufacturing the mold shell to include a conformal system on the second side of the cavity wall. The filling the at least one chamber with the strengthening agent further includes filling the at least one chamber with one of an epoxy, a resin, a cast silicone, and a urethane, and the hardening the strengthening agent includes curing the one of the epoxy, the resin, the cast silicone, and the urethane.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

Figure 1:
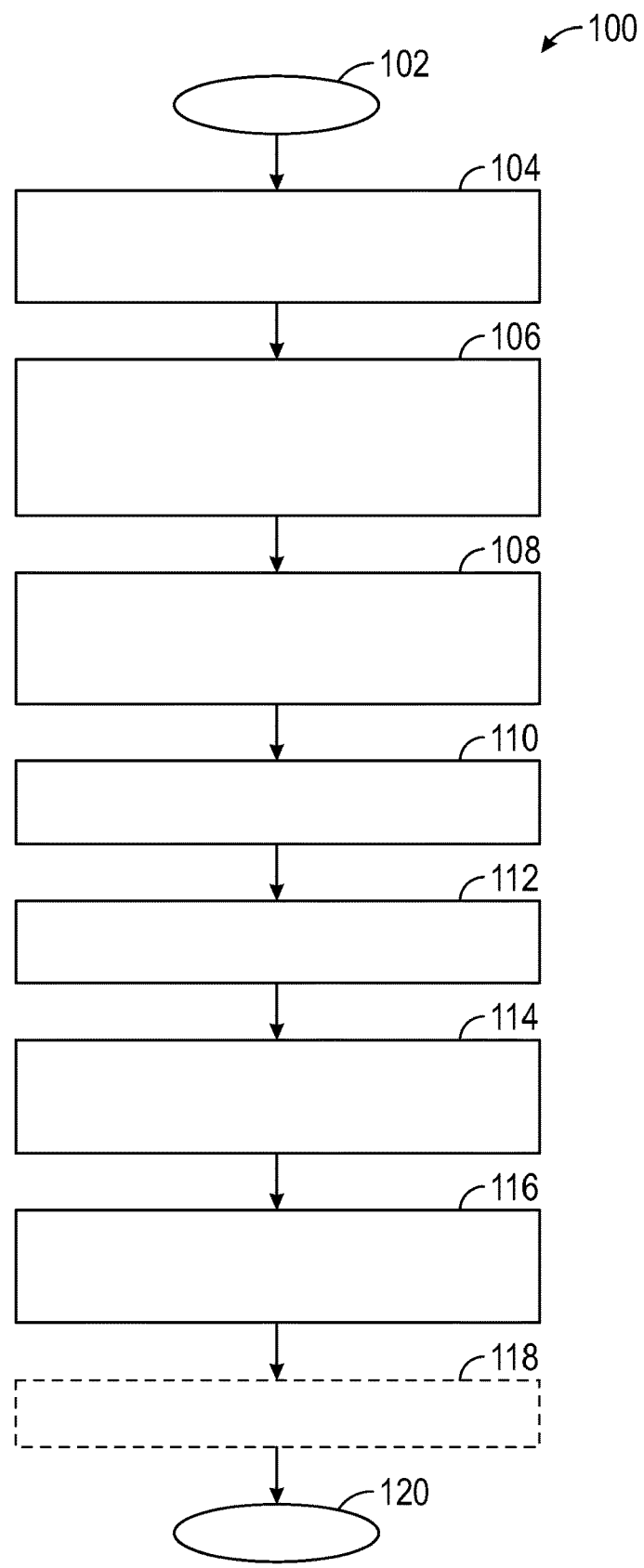
FIG. 1 is a flowchart that illustrates a method for composite molding in accordance with various embodiments.
Figure 2:
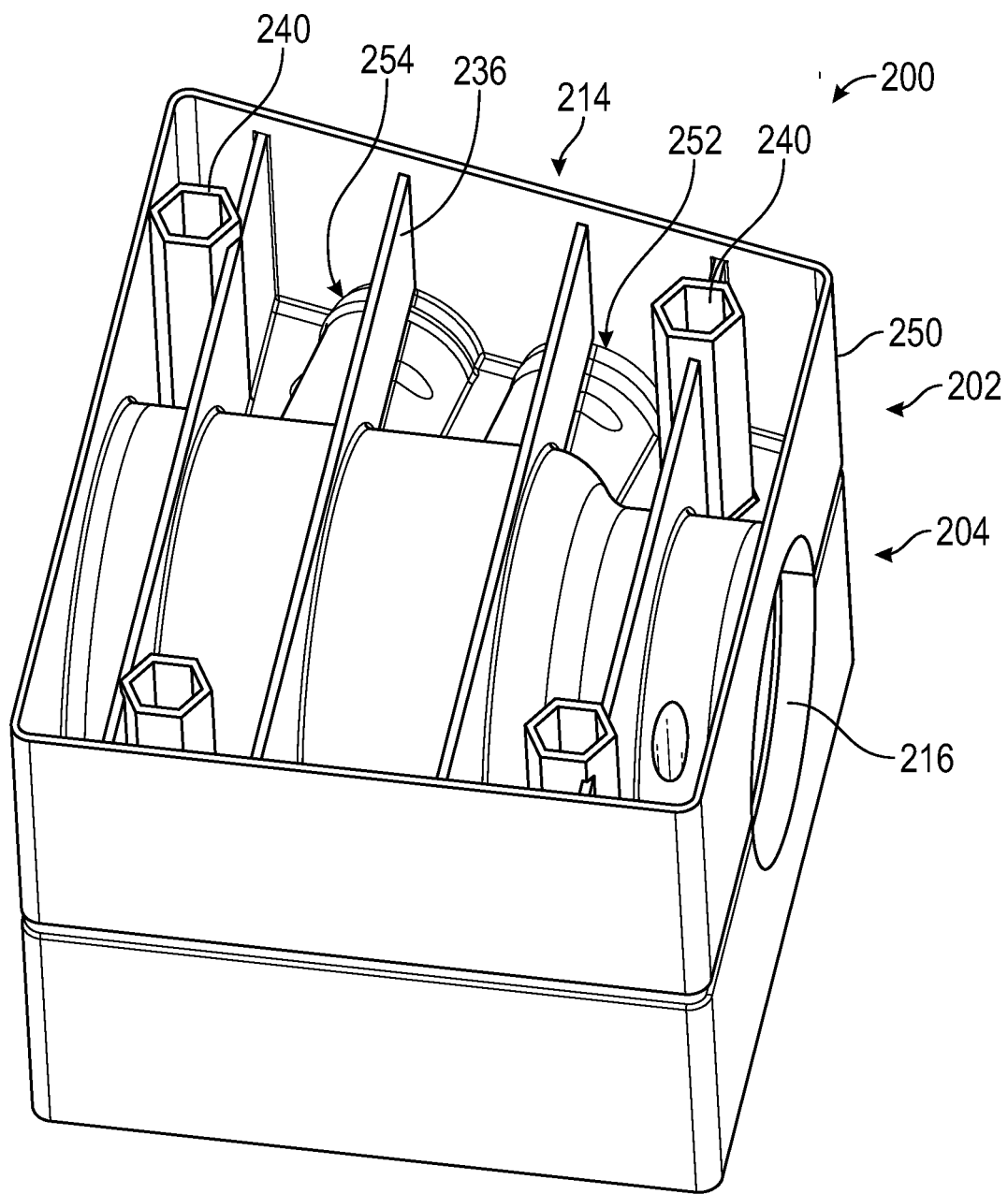
FIG. 2 is a perspective view of an exemplary assembled mold shell for use with a system for composite molding.

With reference to FIGS. 1 and 2, a method for composite molding is shown generally as 100 in accordance with various embodiments. In this example, the method 100 enables the composite molding of a complex part with reduced post-processing required after molding is complete. The part is composed of a polymer-based material, including, but not limited to a composite material, such as carbon fiber, however, the method and systems described herein are not limited to carbon fiber. Rather, the various teachings of the present disclosure may be applied to any suitable polymer-based composite material. As will be discussed, the method 100 and the systems described herein result in a mold having a surface finish that requires minimal to no additional processing before use. Further, the method 100 and systems described herein enable the creation of complex details that are molded onto the part, including, but not limited to letters, numbers, graphics, surface graining, surface textures, trim lines, etc. In addition, the method 100 and systems described herein enable the formation of locating points, cylindrical shafts for positioning additional components, etc. on the part, which provides for ease of assembly of the part to other components.

In one example, at 102, the method 100 for composite molding begins. At 104, with additional reference to FIGS. 2-7, the method 100 includes additively manufacturing a mold shell 200, 300, 400, 500, 600. The mold shell 200, 300, 400, 500, 600 is composed of a polymer-based material, including, but not limited to stereolithography (SLA) resin.

In this example, the mold shell 200, 300, 400, 500, 600 is additively manufactured using SLA three-dimensional printing. It should be noted that the mold shell 200, 300, 400, 500, 600 may be composed of other polymer-based materials, and additively manufactured using different techniques, including, but not limited to vat polymerization (digital light processing (DLP) three-dimensional printing, etc.), powder bed fusion (selective laser sintering three-dimensional printing, Multi Jet Fusion three-dimensional printing, etc.), fused filament fabrication three-dimensional printing, etc. It should be noted that the use of SLA three-dimensional printing, DLP three-dimensional printing or vat polymerization to form the mold shell 200, 300, 400, 500, 600 typically results in the formation of the mold shell 200, 300, 400, 500, 600 with a smooth surface finish, while the use of the other additive manufacturing techniques may require sanding or smoothing of the surface of the mold shell 200, 300, 400, 500, 600. The smooth surface finish of the mold shell 200, 300, 400, 500, 600 produced through SLA three-dimensional printing, DLP three-dimensional printing or vat polymerization results in the mold shell 200, 300, 400, 500, 600 being ready to use for composite lay-ups without sanding, which reduces time and processing of the mold shells 200, 300, 400, 500, 600. Mold shells 200, 300, 400, 500, 600 made via other methods may be sanded smooth before composite lay-up to produce smooth composite parts, however, as discussed, this requires an additional processing step for the mold shells 200, 300, 400, 500, 600 produced via these other methods, which is undesirable. Generally, by additively manufacturing the thin mold shell 200, 300, 400, 500, 600 as described herein, a cost of the mold shell 200, 300, 400, 500, 600 may be reduced, and additionally, complex features, letters, numbers, graphics, etc. may be printed into the mold shell 200, 300, 400, 500, 600, which reduces post-processing of the manufactured part.

Figure 3:
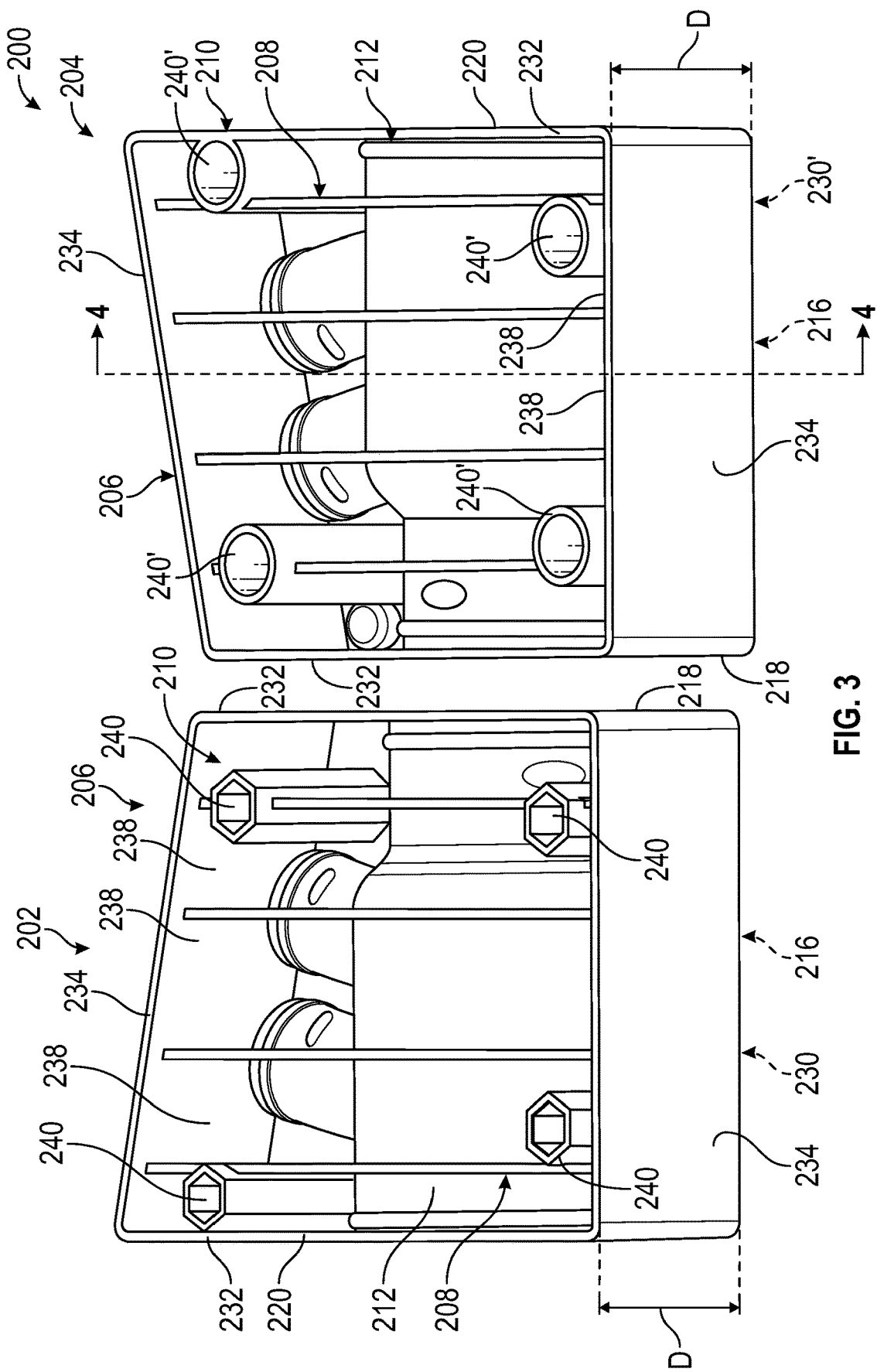
FIG. 3 is an exterior view of a first mold half and a second mold half of the exemplary mold shell of FIG. 2.
Figure 15:
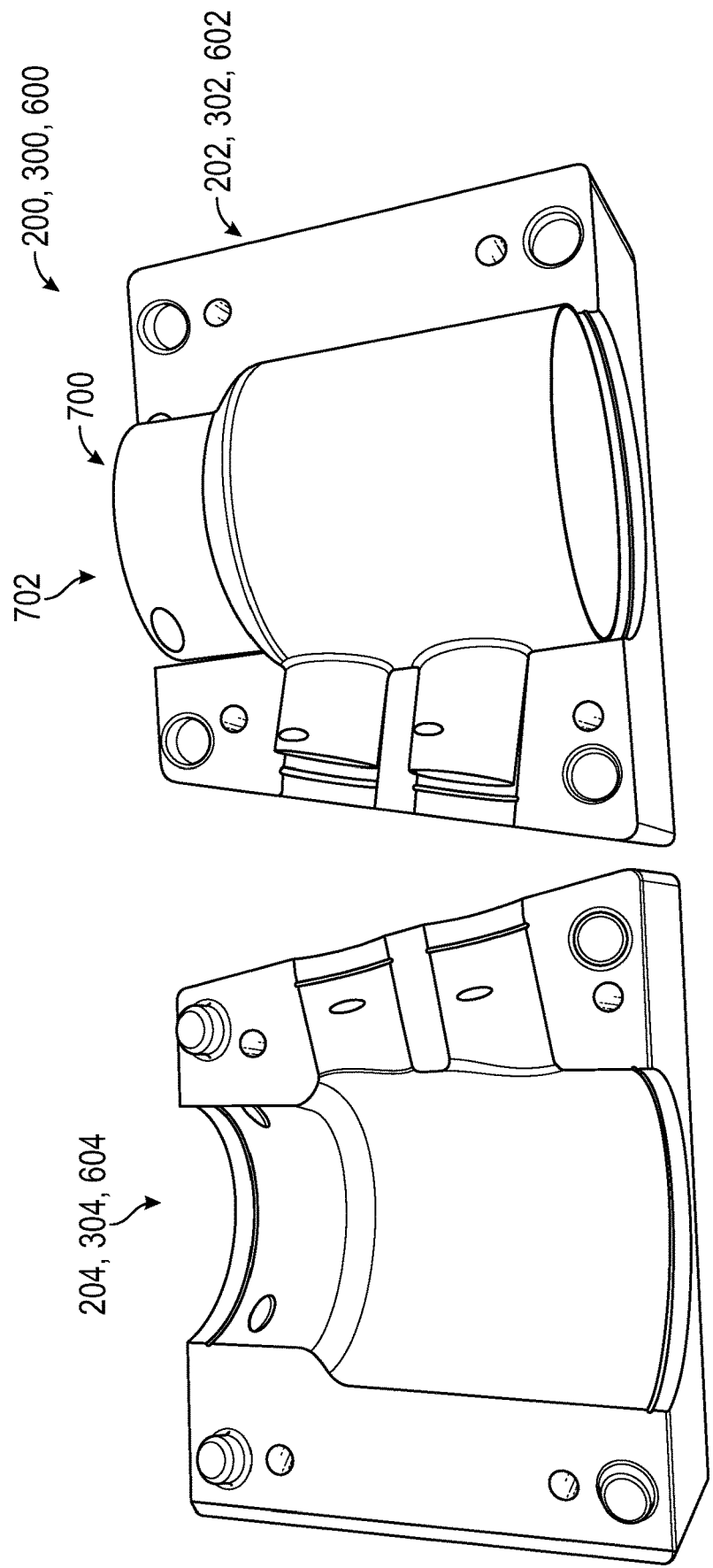
FIG. 15 is an exemplary composite part formed by the method and systems for composite molding using the exemplary mold.

With reference to FIG. 2, in this example, the mold shell 200 includes a first mold half 202 and a second mold half 204 that cooperate to form a composite part 700 (FIG. 15). Each of the first mold half 202 and a second mold half 204 is integrally formed, monolithic or one-piece. With reference to FIG. 3, an exterior view of each of the first mold half 202 and the second mold half 204 is shown. Each of the first mold half 202 and the second mold half 204 includes a plurality of mold walls 206, at least one reinforcement structure 208, at least one mold assembly structure 210, and at least one part forming cavity 212. In addition, although not shown, one or both of the first mold half 202 and the second mold half 204 may include a mold identification feature, including, but not limited to text, numbers, symbols, etc. One or both of the first mold half 202 and the second mold half 204 may also include instructions for lay-up of the composite material, for example.

Figure 4:
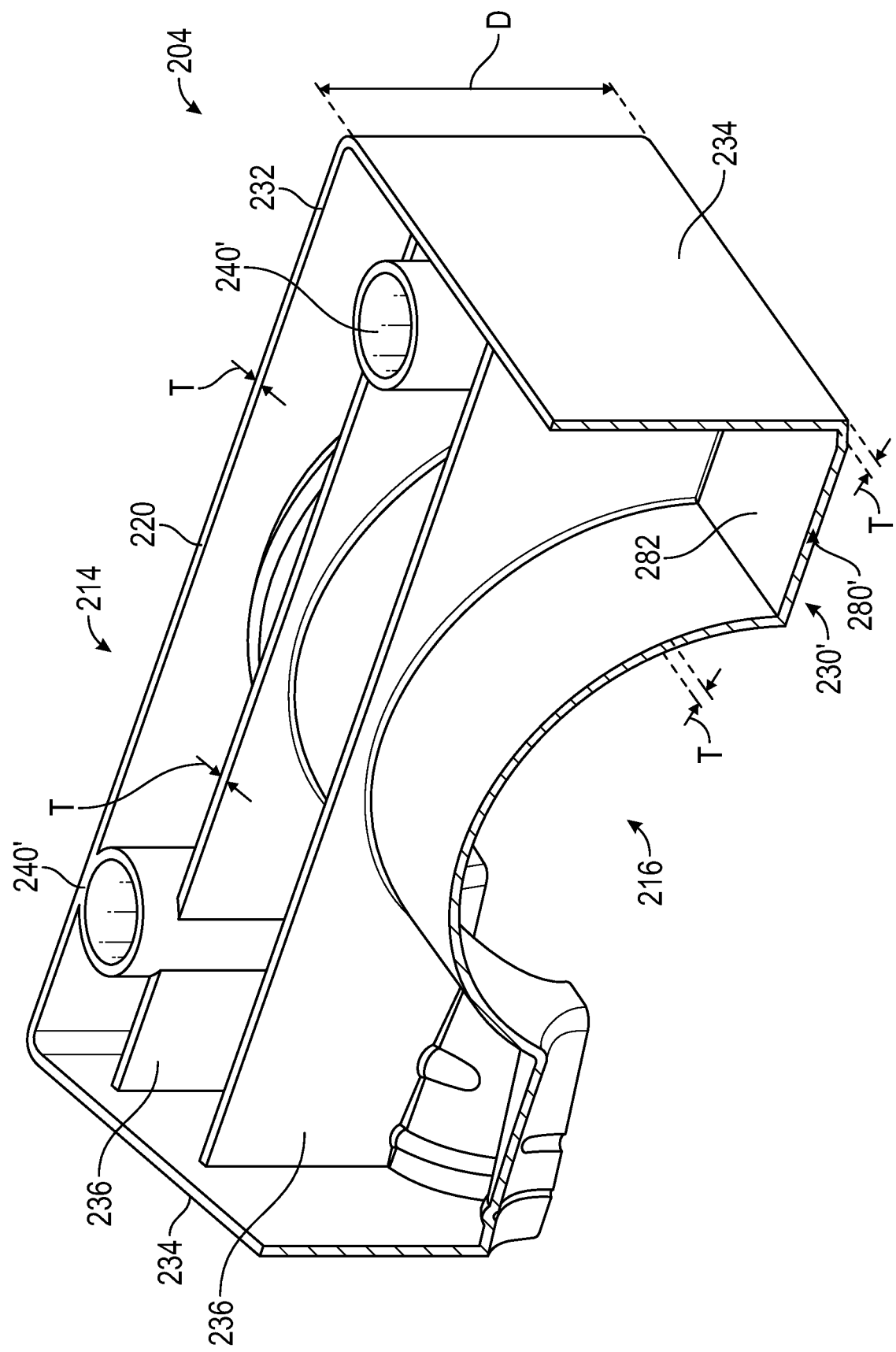
FIG. 4 is a cross-section of the second mold half, taken along line 4-4 of FIG. 3.

Generally, each of the first mold half 202 and the second mold half 204 are additively manufactured at an angle, so that each of the first mold half 202 and the second mold half 204 are supported during their manufacture. In other embodiments, the first mold half 202 and/or the second mold half 204 may include additively manufactured supports to assist in supporting the first mold half 202 and/or the second mold half 204 during additive manufacturing. These additively manufactured supports may be removed from the first mold half 202 and/or the second mold half 204 upon completion of additive manufacturing via trimming, etc. Each of the first mold half 202 and the second mold half 204 has a first or exterior side 214 and an opposite second or interior side 216 (FIG. 4). Each of the first mold half 202 and the second mold half 204 has a first end 218 opposite a second end 220. It should be noted that in this example, the first mold half 202 and the second mold half 204 are substantially similar and thus, the same reference numeral will be used to discuss components that are the same and the same reference numeral with an "'" will be used to denote components that are substantially similar. In other examples, the first mold half 202 and the second mold half 204 may be different depending upon the composite part to be manufactured.

Figure 12:
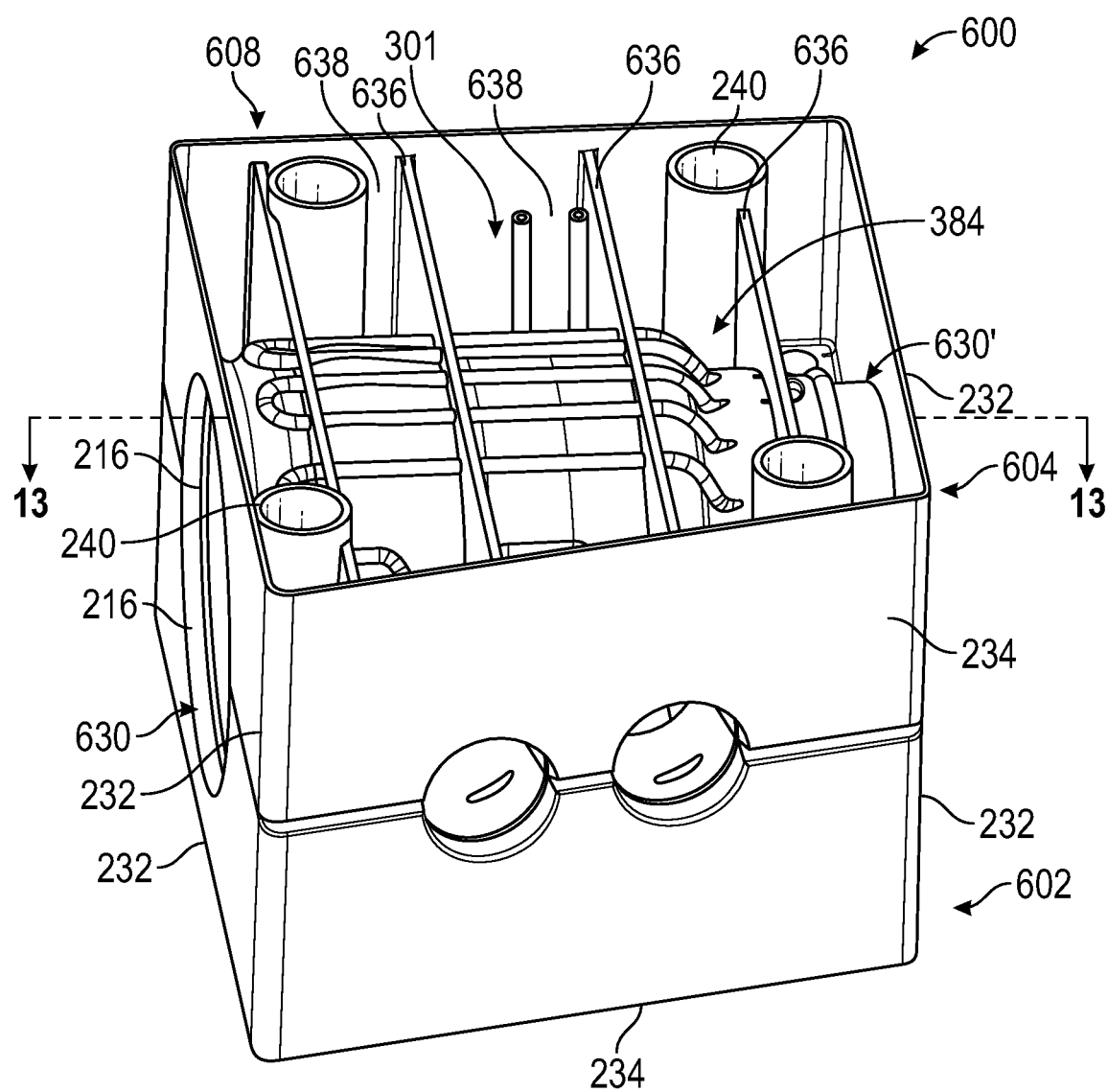
FIG. 12 is a perspective view of another exemplary assembled mold shell for use with a system for composite molding.

The plurality of mold walls 206 define a perimeter of each of the first mold half 202 and the second mold half 204. In one example, each of the first mold half 202 and the second mold half 204 has a substantially polygonal perimeter. Each of the mold walls 206 are planar or straight, and extend from the interior side 216 for a distance D. As will be discussed, by extending for the distance D, the mold walls 206 cooperate to retain a strengthening agent 228 (FIG. 12), which provides each of the first mold half 202 and the second mold half 204 with temperature and pressure resistance. In one example, the mold walls 206 include a cavity wall 230, 230', a pair of endwalls 232 and a pair of sidewalls 234. The cavity wall 230 forms the interior side 216 of the first mold half 202 and the cavity wall 230' forms the interior side 216 of the second mold half 204. The endwalls 232 extend along a respective one of the first end 218 and the second end 220, and the sidewalls 234 interconnect each of the respective endwalls 232. With reference to FIG. 4, each of the cavity walls 230, 230', the endwalls 232 and the sidewalls 234 have a thickness T. In one example, the thickness T is about 0.05 millimeters (mm) to about 1.0 millimeters (mm). By providing each of the mold walls 206 with the reduced thickness T, the mold shell 200 is thin and easy to produce with a minimal amount of material needed.

In one example, the at least one reinforcement structure 208 comprises a plurality of ribs 236. Generally, each of the ribs 236 extends between the sidewalls 234 or extends substantially parallel to the endwalls 232. Each of the ribs 236 has the thickness T (FIG. 4). In one example, the ribs 236 are recessed relative to the sidewalls 234 such that the ribs 236 are not flush with the sidewalls 234. In other words, the ribs 236 are defined to extend from the cavity wall 230, 230' to proximate a terminal surface of the sidewalls 234. This enables the strengthening agent 228 to encapsulate the ribs 236 such that the ribs 236 are internal to the strengthening agent 228 once the strengthening agent 228 is coupled to the first mold half 202 and the second mold half 204. The ribs 236 cooperate with the cavity wall 230, 230' to define a plurality of chambers 238 to receive the strengthening agent 228. It should be noted that the use of ribs 236 is merely exemplary, as the at least one reinforcement structure 208 may comprise any support structure that cooperates with the strengthening agent 228, including, but not limited to ribs, lattice, gyroids, or other semi-dense reinforcement structure. In this example, each of the first mold half 202 and the second mold half 204 includes four ribs 236, however, the first mold half 202 and the second mold half 204 may include any number of ribs 236, and may not include the same number of ribs 236. In certain instances, the reinforcement structure 208 enables the first mold half 202 and the second mold half 204 to be additively manufactured without additive manufacturing supports.

Figure 5:
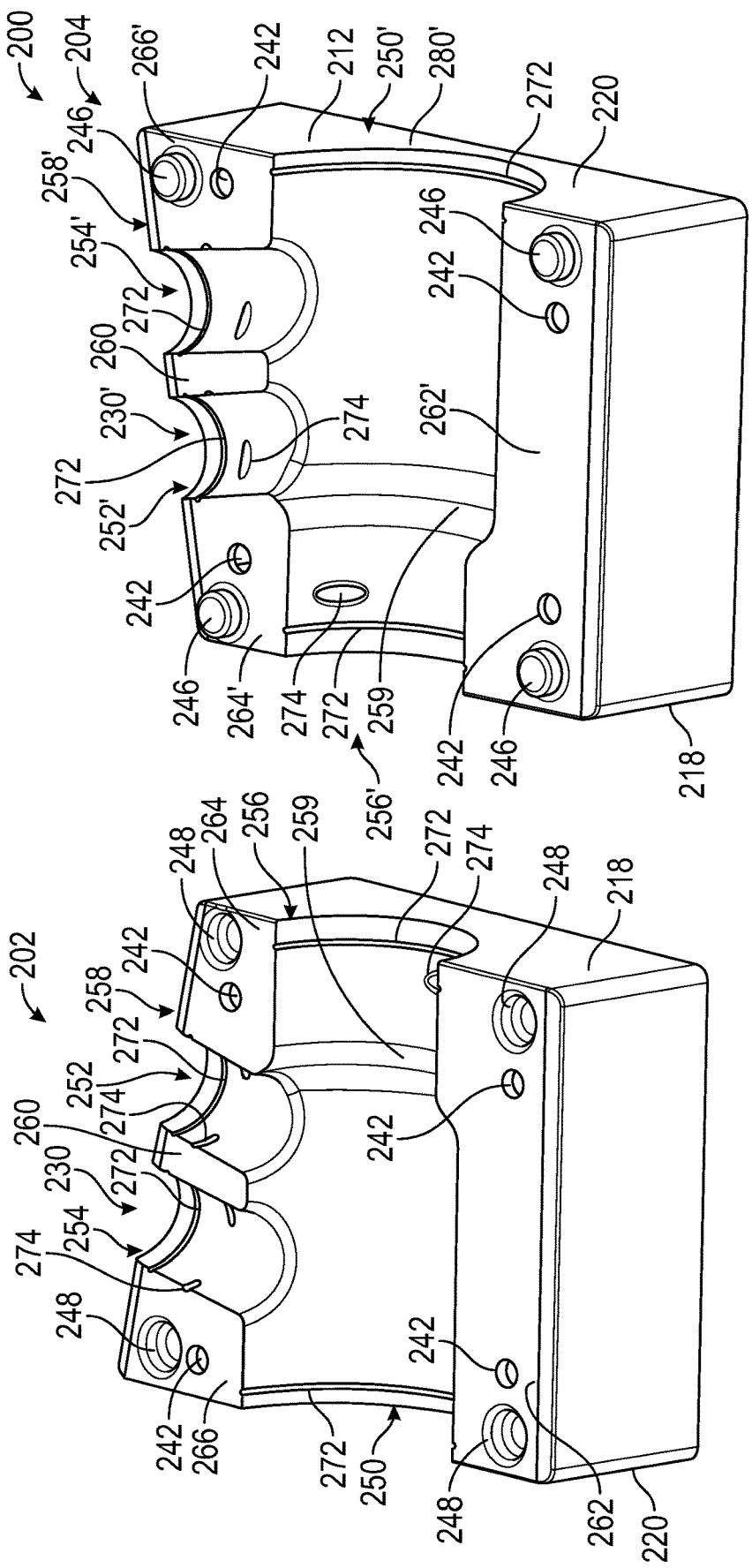
FIG. 5 is an interior view of the first mold half and the second mold half of the exemplary mold shell of FIG. 2.

In one example, the mold assembly structure 210 includes at least one fastener passage 240, at least one fastener bore 242 (FIG. 5) and at least one locating structure 244 (FIG. 5). In this example, the mold assembly structure 210 of the first mold half 202 includes four fastener passages 240 and the mold assembly structure 210 of the second mold half 204 includes four fastener passages 240'. The four fastener passages 240 and the four fastener passages 240' are spaced apart about the perimeter of the respective one of the first mold half 202 and the second mold half 204. For example, two of the fastener passages 240, 240' are defined proximate or near the first end 218 and two of the fastener passages 240, 240' are defined proximate or near the second end 220. Typically, the fastener passages 240, 240' are defined so as to be near corners associated with each of the first mold half 202 and the second mold half 204 to assist in coupling the first mold half 202 to the second mold half 204. Each of the fastener passages 240 are configured to receive a mechanical fastener, including, but not limited to a bolt, etc., which cooperates with a nut, etc. disposed at an end of the respective fastener passage 240' to clamp the first mold half 202 to the second mold half 204. In one example, the fastener passages 240' associated with the second mold half 204 have a substantially circular cross-section, while the fastener passages 240 associated with the first mold half 202 have a substantially hexagonal cross-section. The circular cross-section of the fastener passages 240' assists in receiving the mechanical fastener and optionally, a tool associated with the mechanical fastener, while the hexagonal cross-section of the fastener passages 240 assists in receiving the nut, and optionally a tool associated with the nut, to clamp the first mold half 202 to the second mold half 204. It should be noted that the fastener passages 240, 240' may be the same between the first mold half 202 and the second mold half 204, if desired. Each of the fastener passages 240, 240' is in communication with a respective fastener bore 242.

With reference to FIG. 5, the interior side 216 of each of the first mold half 202 and the second mold half 204 is shown. In this example, each of the first mold half 202 and the second mold half 204 includes four fastener bores 242, with each of the fastener bores 242 associated with one of the fastener passages 240, 240'. The fastener bores 242 are circular, and are defined through the part forming cavity 212. The fastener bores 242 enable the mechanical fastener to pass through the interior side 216 and engage with the nut to clamp the first mold half 202 to the second mold half 204.

In this example, the mold assembly structure 210 includes four locating structures 244. The locating structures 244 assist in coupling the first mold half 202 and the second mold half 204 together, and may provide error proofing. In one example, each of the locating structures 244 includes a locating pin 246 and a pin recess 248. The first mold half 202 includes the pin recesses 248, while the second mold half 204 includes the locating pins 246. It should be noted that the first mold half 202 may include the locating pins 246 and the second mold half 204 may include the pin recesses 248, or each of the first mold half 202 and the second mold half 204 may include a combination of the locating pins 246 and the pin recesses 248, if desired. Moreover, the use of the locating pins 246 and the pin recesses 248 is merely an example. The locating pins 246 are defined to extend outward from the cavity wall 230' of the interior side 216, and are defined proximate or at corners of the second mold half 204 to assist in assembling the second mold half 204 to the first mold half 202. Each of the locating pins 246 is cylindrical, and is also defined proximate or near a respective one of the fastener bores 242 to ensure that the second mold half 204 is properly aligned with and coupled to the first mold half 202 to assist in clamping the second mold half 204 to the first mold half 202 with the mechanical fastener. The pin recesses 248 are defined to extend inward or are defined into the cavity wall 230 of the interior side 216. The pin recesses 248 are cylindrical and are defined to receive the respective one of the locating pins 246 when the second mold half 204 is properly aligned with and coupled to the first mold half 202. In this example, each of the pin recesses 248 are also defined proximate or at corners of the second mold half 204 to receive the respective one of the locating pins 246 to assist in assembling the second mold half 204 to the first mold half 202.

In this example, the at least one part forming cavity 212 is defined by a portion 256, 256' of the cavity wall 230, 230'. Stated another way, the cavity wall 230, 230' is formed with a shape that corresponds to the predetermined exterior shape of the composite part 700 (FIG. 15). As the part forming cavity 212 may have any shape to form any predetermined part, the following description of the part forming cavity 212 is merely an example. In this example, the part forming cavity 212 includes a first conduit cavity 250, 250', a second conduit cavity 252, 252' and a third conduit cavity 254, 254' each of which is defined in the portion 256, 256' of the cavity wall 230, 230'. Generally, each of the first conduit cavity 250, 250', the second conduit cavity 252, 252' and the third conduit cavity 254, 254' is recessed relative to a second portion 258, 258' of the cavity wall 230, 230'. The second portion 258, 258' of the cavity wall 230, 230' forms a contact surface for the respective one of the first mold half 202 and the second mold half 204 against the other of the first mold half 202 and the second mold half 204 when the first mold half 202 is coupled to the second mold half 204.

In the example of the first mold half 202, the cavity wall 230 defines the first conduit cavity 250, the second conduit cavity 252 and the third conduit cavity 254. The first conduit cavity 250 is substantially semi-cylindrical, and includes a taper 259 proximate or near the first end 218. The second conduit cavity 252 and the third conduit cavity 254 are each substantially semi-cylindrical, and are in communication with the first conduit cavity 250. The second conduit cavity 252 is spaced apart from the third conduit cavity 254 by a section 260 of the second portion 258 of the cavity wall 230 so that the second conduit cavity 252 is discrete from the third conduit cavity 254. A section 262 of the second portion 258 of the cavity wall 230 defines a boundary of the first conduit cavity 250, and a section 264 defines a boundary between the first conduit cavity 250 and the second conduit cavity 252. A section 266 defines a boundary between the second conduit cavity 252 and the third conduit cavity 254. Each of the pin recesses 248 and the fastener bores 242 are defined in respective ones of the sections 262, 264, 266.

In addition, one or more of the cavities 250, 252, 254 may include one or more part surface structures 270. In this example, the first conduit cavity 250 includes two pairs of cut or trim line grooves 272. The trim line grooves 272 provide a corresponding line on the exterior surface of the composite part 700 (FIG. 15), which may be used by an operator as a reference for a cutting or trimming operation. The first conduit cavity 250 includes one pair of trim line grooves 272 proximate the first end 218, and one pair of trim line grooves 272 proximate the second end 220. The first conduit cavity 250 also includes a recessed tab 274. The recessed tab 274 creates a projection on the exterior surface of the part (FIG. X), which may be used to couple a conduit or hose to the part. Similarly, each of the second conduit cavity 252 and the third conduit cavity 254 includes a pair of the trim line grooves 272. The second conduit cavity 252 and the third conduit cavity 254 also includes at least one of the recessed tabs 274.

In the example of the second mold half 204, the cavity wall 230' defines the first conduit cavity 250', the second conduit cavity 252' and the third conduit cavity 254'. The first conduit cavity 250' is substantially semi-cylindrical, and includes the taper 259 proximate or near the first end 218. The second conduit cavity 252' and the third conduit cavity 254' are each substantially semi-cylindrical, and are in communication with the first conduit cavity 250'. The second conduit cavity 252' is spaced apart from the third conduit cavity 254' by the section 260 of the second portion 258' of the cavity wall 230' so that the second conduit cavity 252' is discrete from the third conduit cavity 254'. A section 262' of the second portion 258' of the cavity wall 230' defines a boundary of the first conduit cavity 250', and a section 264' defines a boundary between the first conduit cavity 250' and the second conduit cavity 252'. A section 266' defines a boundary between the second conduit cavity 252' and the third conduit cavity 254'. Each of the locating pins 246 and the fastener bores 242 are defined in respective ones of the sections 262', 264', 266'.

In addition, one or more of the cavities 250', 252', 254' may include one or more part surface structures 270. In this example, the first conduit cavity 250' includes two pairs of the trim line grooves 272. The first conduit cavity 250' includes one pair of trim line grooves 272 proximate the first end 218, and one pair of trim line grooves 272 proximate the second end 220. The first conduit cavity 250' also includes the recessed tab 274. Each of the second conduit cavity 252' and the third conduit cavity 254' includes a pair of the trim line grooves 272. The second conduit cavity 252' and the third conduit cavity 254' also includes the recessed tab 274.

Thus, generally, the cavity wall 230, 230' defines the cavities 250, 250', 252, 252', 254, 254' for the manufacture of the composite part 700 (FIG. 15), and also defines the boundaries (sections 260, 262, 262', 264, 264', 266, 266') associated with the composite part 700 (FIG. 15). It should be noted that even though the cavity wall 230, 230' includes both the cavities 250, 250', 252, 252', 254, 254' and the boundaries (sections 260, 262, 262', 264, 264', 266, 266'), the thickness of the entirety of the cavity wall 230, 230' is the thickness T (FIG. 4). The cavity wall 230, 230' has the part forming cavity 212 on a first side 280, and an opposite second side 282 of the cavity wall 230, 230' cooperates with the mold walls 206 and the ribs 236 to define the chambers 238 to receive the strengthening agent 228.

Figure 6:
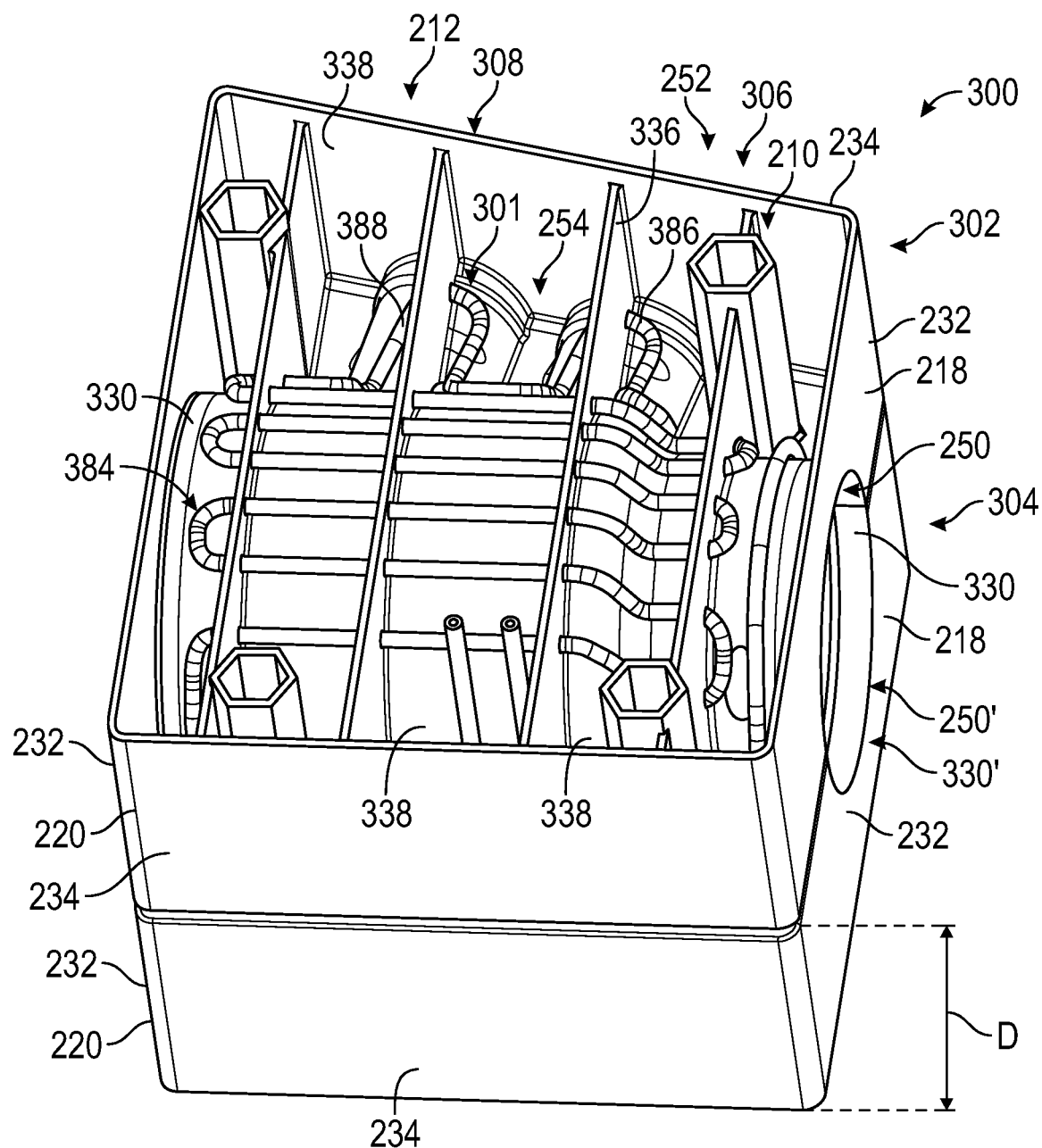
FIG. 6 is a front perspective view of another exemplary assembled mold shell for use with a system for composite molding.
Figure 7:
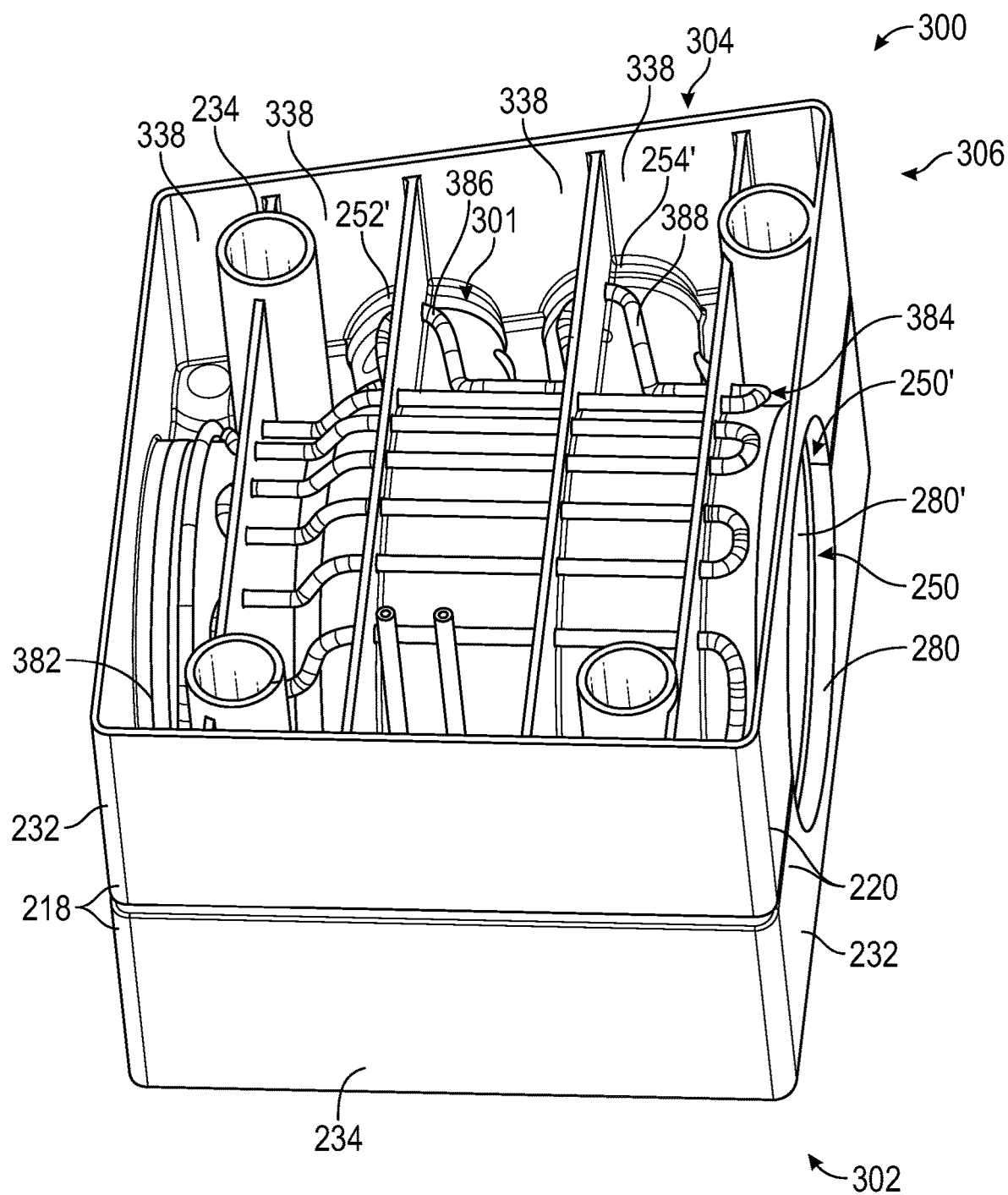
FIG. 7 is a rear perspective view of another exemplary assembled mold shell for use with a system for composite molding.

It should be noted that the mold shell shown in FIGS. 2-5 may be configured differently for composite molding. For example, with reference to FIGS. 6 and 7, another exemplary mold shell 300 is shown for use with the method 100. As the mold shell 300 includes components that are the same or similar to components of the mold shell 200 discussed with regard to FIGS. 2-5, the same reference numerals will be used to denote the same components. In this example, the mold shell 300 includes a first mold half 302 and a second mold half 304 that cooperate to form the composite part 700 (FIG. 15), and each of the first mold half 302 and the second mold half 304 includes a conformal system 301. Each of the first mold half 302 and a second mold half 304 is integrally formed, monolithic or one-piece with the conformal system 301. With reference to FIG. 6, an exterior view of the first mold half 302 is shown, and an exterior view of the second mold half 304 is shown in FIG. 7. Each of the first mold half 302 and the second mold half 304 includes a plurality of mold walls 306, a reinforcement structure 308, the mold assembly structure 210, and the part forming cavity 212. In addition, although not shown, one or both of the first mold half 302 and the second mold half 304 may include a mold identification feature, including, but not limited to text, numbers, symbols, etc. One or both of the first mold half 302 and the second mold half 304 may also include instructions for lay-up of the composite material, for example.

Generally, each of the first mold half 302 and the second mold half 304 are additively manufactured at an angle, so that each of the first mold half 302 and the second mold half 304 are supported during their manufacture. In other embodiments, the first mold half 302 and/or the second mold half 304 may include additively manufactured supports to assist in supporting the first mold half 302 and/or the second mold half 304 during additive manufacturing. These additively manufactured supports may be removed from the first mold half 302 and/or the second mold half 304 upon completion of additive manufacturing via trimming, etc. Each of the first mold half 302 and the second mold half 304 has a first or exterior side 314 and the opposite second or interior side 216 (FIG. 4). Each of the first mold half 302 and the second mold half 304 has the first end 218 opposite the second end 220. It should be noted that in this example, the first mold half 302 and the second mold half 304 are substantially similar and thus, the same reference numeral will be used to discuss components that are the same and the same reference numeral with an "'" will be used to denote components that are substantially similar. In other examples, the first mold half 302 and the second mold half 304 may be different depending upon the composite part to be manufactured.

The plurality of mold walls 306 define a perimeter of each of the first mold half 302 and the second mold half 304. In one example, each of the first mold half 302 and the second mold half 304 has a substantially polygonal perimeter. Each of the mold walls 306 are planar or straight, and extend from the interior side 216 for the distance D. By extending for the distance D, the mold walls 306 cooperate to retain the strengthening agent 228 (FIG. 12), which provides each of the first mold half 302 and the second mold half 304 with temperature and pressure resistance. In one example, the mold walls 306 include a cavity wall 330, 330', the pair of endwalls 232, and the pair of sidewalls 234. The cavity wall 330 forms the interior side 216 of the first mold half 302 and the cavity wall 330' forms the interior side 216 of the second mold half 304. Each of the cavity walls 330, 330', the endwalls 232 and the sidewalls 234 have the thickness T (FIG. 4).

In one example, the at least one reinforcement structure 308 comprises a plurality of ribs 336. Generally, each of the ribs 336 extends between the sidewalls 234 or extends substantially parallel to the endwalls 232. Each of the ribs 336 has the thickness T (FIG. 4). In one example, the ribs 336 are recessed relative to the sidewalls 234 such that the ribs 236 are not flush with the sidewalls 234. In other words, the ribs 336 are defined to extend from the cavity wall 330, 330' or the conformal system 301 to proximate a terminal surface of the sidewalls 234. This enables the strengthening agent 228 to encapsulate the ribs 336 such that the ribs 336 are internal to the strengthening agent 228 once the strengthening agent 228 is coupled to the first mold half 302 and the second mold half 304. The ribs 336 cooperate with the conformal system 301 and the cavity wall 330, 330' to define a plurality of chambers 338 to receive the strengthening agent 228. It should be noted that the use of ribs 336 is merely exemplary, as the at least one reinforcement structure 308 may comprise any support structure that cooperates with the strengthening agent 228, including, but not limited to ribs, lattice, gyroids, or other semi-dense reinforcement structure. In this example, each of the first mold half 302 and the second mold half 304 includes four ribs 336, however, the first mold half 302 and the second mold half 304 may include any number of ribs 336, and may not include the same number of ribs 336. In certain instances, the reinforcement structure 308 enables the first mold half 302 and the second mold half 304 to be additively manufactured without additive manufacturing supports.

The mold assembly structure 210 assists in forming the mold shell 300. In this example, the mold assembly structure 210 includes the fastener passages 240, 240', the fastener bores 242 (FIG. 5) and the locating structures 244 (FIG. 5). Each of the fastener passages 240 are configured to receive the mechanical fastener, including, but not limited to a bolt, etc., which cooperates with the nut, etc. disposed at an end of the respective fastener passage 240' to clamp the first mold half 302 to the second mold half 304. Each of the fastener passages 240, 240' is in communication with a respective fastener bore 242. The mold assembly structure 210 includes four locating structures 244 to assist in coupling the first mold half 302 and the second mold half 304 together, and may provide error proofing. In one example, each of the locating structures 244 includes the locating pin 246 and the pin recess 248 (FIG. 5).

The part forming cavity 212 is defined by the portion 256, 256' (FIG. 5) of the cavity wall 330, 330'. Stated another way, the cavity wall 330, 330' is formed with a shape that corresponds to the predetermined exterior shape of the composite part 700 (FIG. 15). As the part forming cavity 212 is the same between the mold shell 200 and the mold shell 300, the part forming cavity 212 and the interior side 216 will not be discussed in detail herein. In this example, the part forming cavity 212 includes the first conduit cavity 250, 250', the second conduit cavity 252, 252' and the third conduit cavity 254, 254' each of which is defined in the portion 256, 256' of the cavity wall 330, 330'. The second portion 258, 258' of the cavity wall 330, 330' forms a contact surface for the respective one of the first mold half 302 and the second mold half 304 against the other of the first mold half 302 and the second mold half 304 when the first mold half 302 is coupled to the second mold half 304.

Generally, the cavity wall 330, 330' defines the cavities 250, 250', 252, 252', 254, 254' (FIG. 5) for the manufacture of the composite part 700 (FIG. 15), and also defines the boundaries (sections 260, 262, 262', 264, 264', 266, 266') associated with the composite part 700 (FIG. 15). It should be noted that even though the cavity wall 330, 330' includes both the cavities 250, 250', 252, 252', 254, 254' and the boundaries (sections 260, 262, 262', 264, 264', 266, 266'), the thickness of the entirety of the cavity wall 330, 330' is the thickness T (FIG. 4). The cavity wall 330, 330' has the part forming cavity 212 on the first side 280, 280' (FIG. 5), and an opposite second side 382 of the cavity wall 330, 330' cooperates with the mold walls 306, the ribs 336 and the conformal system 301 to define the chambers 338 to receive the strengthening agent 228. The conformal system 301 is defined along the second side 382 of the cavity wall 330, 330'.

In this example, the conformal system 301 is a conformal tubing system, which is defined to extend in a serpentine pattern generally indicated as 384 along at least a portion of the second side 382 of the cavity wall 330, 330'. Generally, the conformal system 301 extends in the serpentine pattern 384 along the second side 382 so as to be opposite the first conduit cavity 250, 250'. The conformal system 301 also extends in a first loop 386 on the second side 382 opposite the second conduit cavity 252, 252' and a second loop 388 on the second side 382 opposite the third conduit cavity 254, 254'. Each of the serpentine pattern 384, the first loop 386 and the second loop 388 are in fluid communication. In this example, the conformal system 301 includes an inlet 390 and an outlet 392. Fluid, including, but not limited to heated or cooled air, heated or cooled gas, heated or cooled non-Newtonian fluid, heated or cooled liquid, etc. may enter the conformal system 301 via the inlet 390 and flow through the serpentine pattern 384, the first loop 386 and the second loop 388 to exit via the outlet 392. The use of a heated fluid may reduce cure time by heating the part forming cavity 212, while the use of a cooled fluid may assist in removing the part from the part forming cavity 212.

It should be noted while the conformal system 301 is described herein as being used for the heated or cooled fluid, the conformal system 301 may also be used to position one or more sensors adjacent to the cavity wall 330, 330' to observe the curing of the composite. For example, a strain gauge or a temperature sensor may be inserted through the conformal system 301 for observing the part forming cavity 212. Moreover, in certain examples, the conformal system 301 may be in fluid communication with the first side 380 and may be coupled to a source of a vacuum, to assist in coupling the composite to the mold shell 300 or a pneumatic supply to assist in ejecting the part from the mold shell 300. Further, the conformal system 301 may be used to position electrical wires for heating the mold shell 300. Generally, since the conformal system 301 is integrally formed with the first mold half 302 and the second mold half 304 during additive manufacturing, the position of the conformal system 301 on each of the first mold half 302 and the second mold half 304 may be precisely located.

Figure 8:
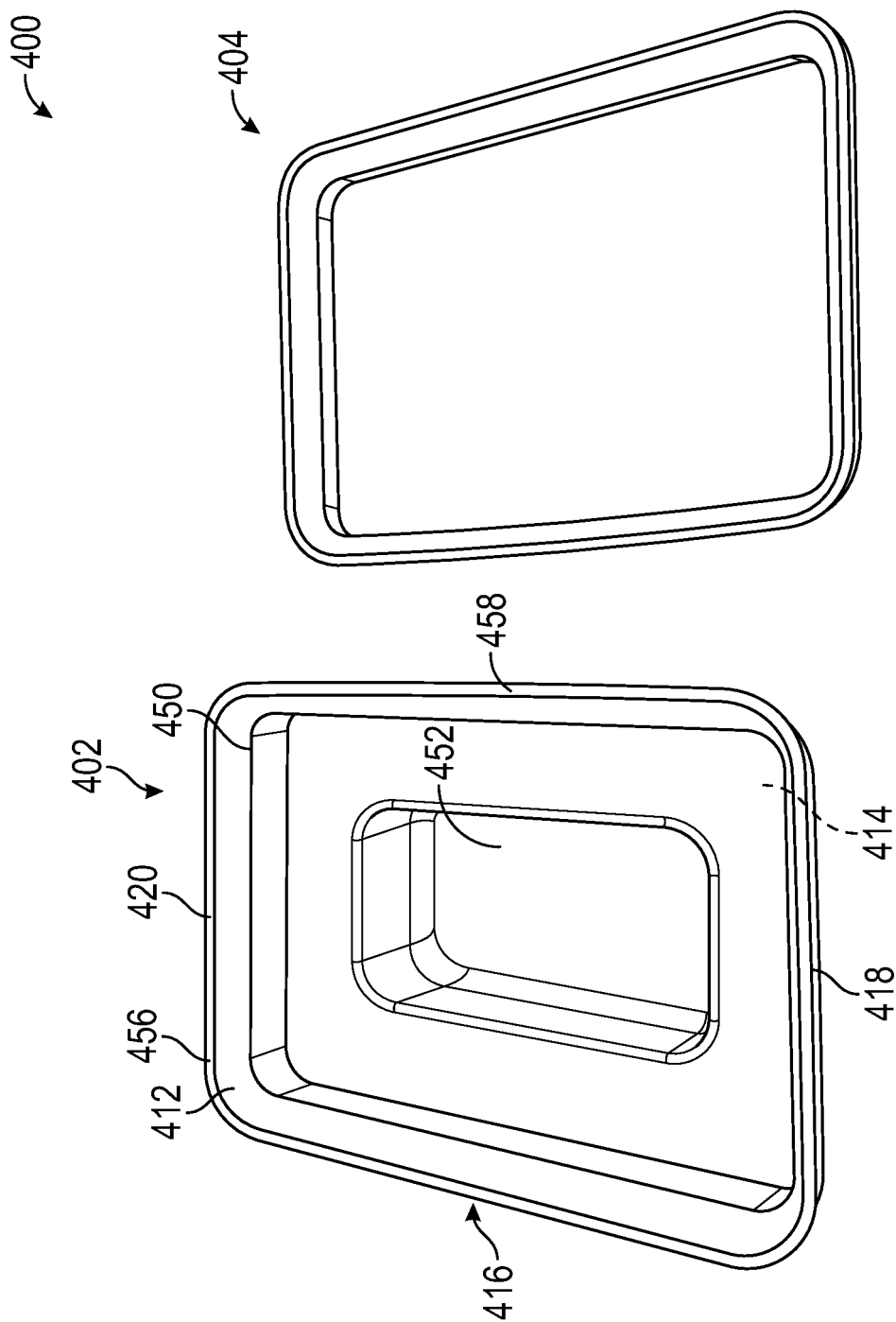
FIG. 8 is an exploded perspective view of another exemplary mold shell for use with a system for composite molding.

It should be noted that the mold shells 200, 300 shown in FIGS. 2-7 are merely example mold shells for producing a duct, and that a variety of other mold shells may be additively manufactured to produce a variety of different parts. Moreover, while the mold shells 200, 300 are illustrated and described herein as including two pieces, the mold shells produced using the method 100 may have any number of pieces and any predetermined geometry. For example, with reference to FIG. 8, a mold shell 400 is shown for use with the method 100. In this example, the mold shell 400 includes a first mold half 402 and a second mold half 404 that cooperate to form a composite part. With reference to FIG. 8, an interior view of the first mold half 402 is shown along with an exterior view of the second mold half 404. Although not shown, one or both of the first mold half 402 and the second mold half 404 may include a mold identification feature, including, but not limited to text, numbers, symbols, etc. One or both of the first mold half 402 and the second mold half 404 may also include instructions for lay-up of the composite material, for example.

The first mold half 402 includes at least one part forming cavity 412. Generally, the first mold half 402 is additively manufactured at an angle, so that the first mold half 402 is supported during manufacture. In other embodiments, the first mold half 402 may include additively manufactured supports to assist in supporting the first mold half 402 and/or the second mold half 404 during additive manufacturing. These additively manufactured supports may be removed from the first mold half 402 upon completion of additive manufacturing via trimming, etc. The first mold half 402 has a first or exterior side 414 and an opposite second or interior side 416. The first mold half 402 has a first end 418 opposite a second end 420.

In this example, the part forming cavity 412 is defined by a portion 456 of a cavity wall 430. Stated another way, the cavity wall 430 is formed with a shape that corresponds to the predetermined exterior shape of the composite part 700 (FIG. 15). In this example, the part forming cavity 412 includes a first cavity 450 and a second cavity 452 defined within the first cavity 450. Generally, each of the first cavity 450 and the second cavity 452 is recessed relative to a second portion 458 of the cavity wall 430. The second portion 458 of the cavity wall 430 receives the second mold half 404 in the proper orientation relative to the first mold half 402 when the first mold half 402 is coupled to the second mold half 404. The second mold half 404 is substantially a rectangular ring. The second mold half 404 may be received within the first mold half 402 to form the mold shell 400.

Figure 9:
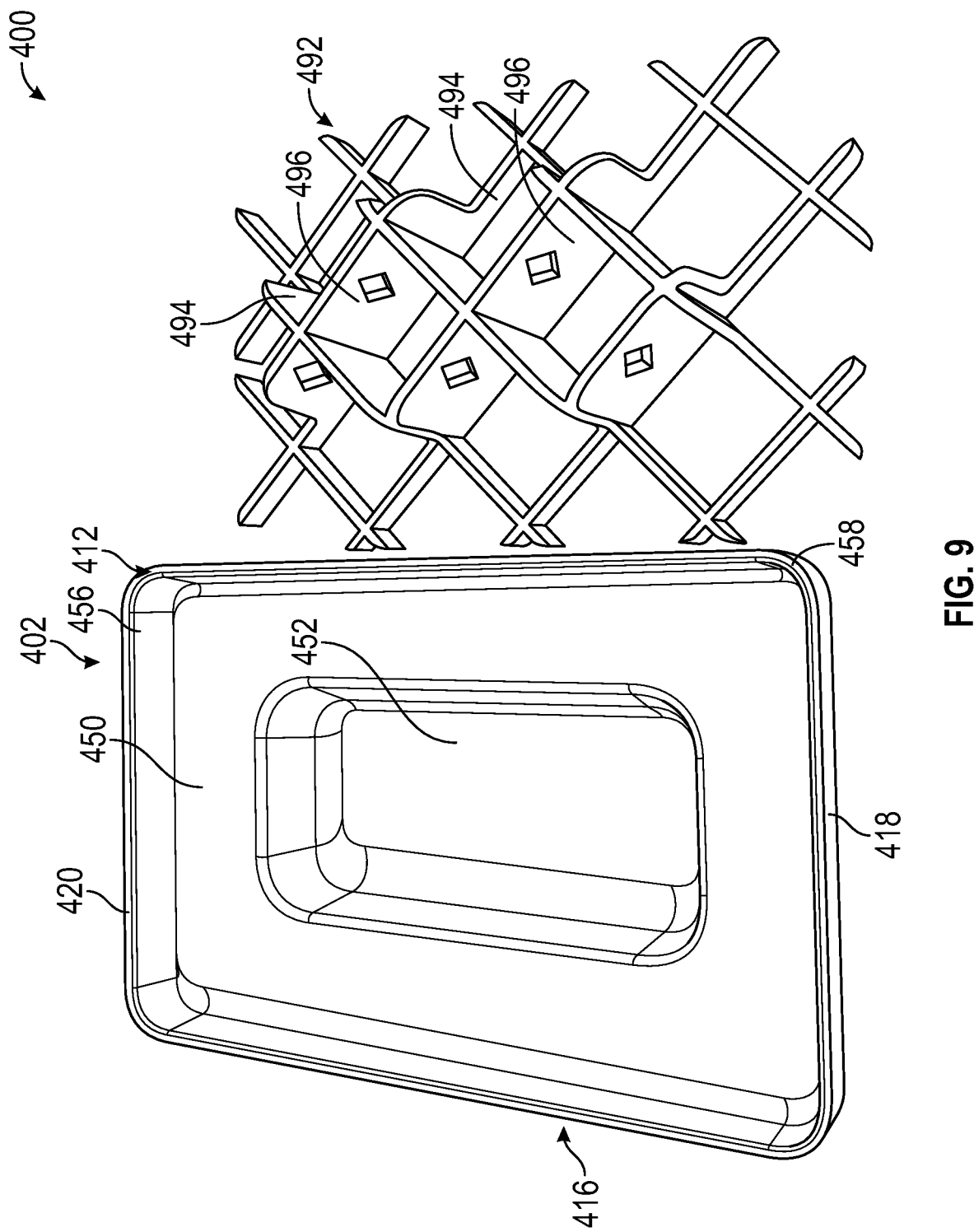
FIG. 9 is an exploded perspective view of another exemplary mold shell for use with a system for composite molding.

In this example, the first mold half 402 does not define a reinforcement structure that receives the strengthening agent 228. Rather, in this example, with reference to FIG. 9, a lattice structure 492 may be used to reinforce the mold shell 400 once the composite material is positioned within the cavities 450, 452. In one example, the lattice structure 492 may be positioned within the second mold half 404, when the second mold half 404 is coupled to the first mold half 402. The lattice structure 492 may be composed of a polymer-based material, including, but not limited to stereolithography (SLA) resin. In this example, the lattice structure 492 is additively manufactured using SLA three-dimensional printing. It should be noted that the lattice structure 492 may be composed of other polymer-based materials, and additively manufactured using different techniques, including, but not limited to vat polymerization (digital light processing three-dimensional printing, etc.), powder bed fusion (selective laser sintering three-dimensional printing, MultiJet fusion three-dimensional printing, etc.), fused filament fabrication three-dimensional printing, etc. The lattice structure 492 may include a portion with enlarged cell walls 494, which cooperate to define one or more chambers 496. Each of the chambers 496 may be configured to receive the strengthening agent 228 to impart temperature and pressure resistance to the mold shell 400 via the lattice structure 492.

Figure 10:
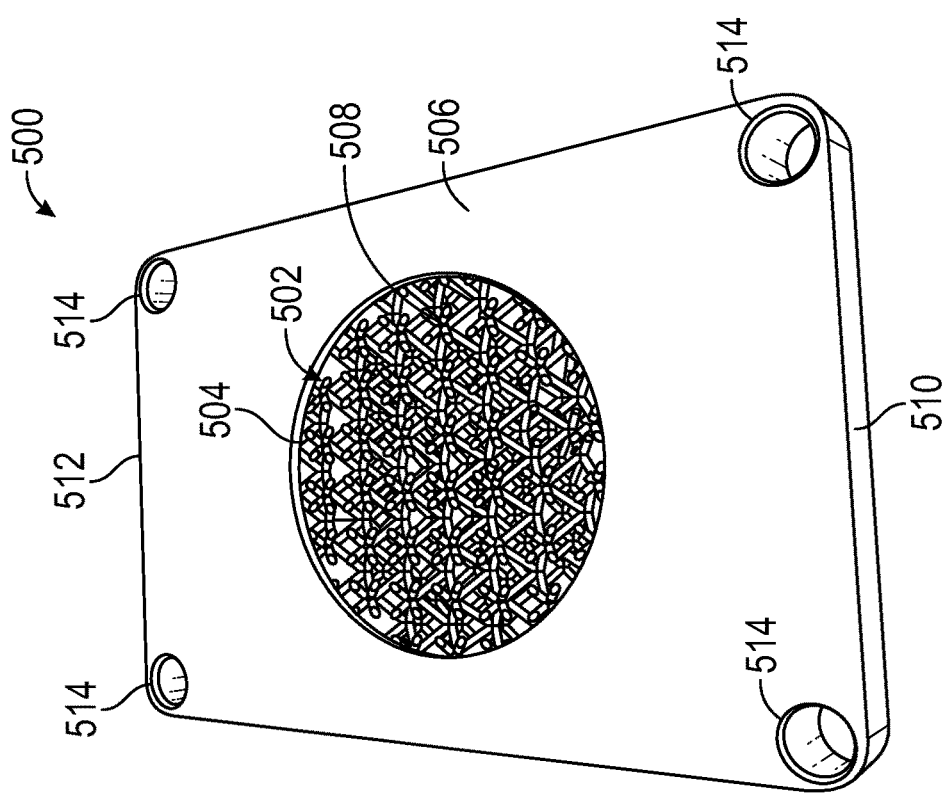
FIG. 10 is a rear perspective view of another exemplary mold shell for use with a system for composite molding, in which an internal reinforcement chamber and one or more drain openings are uncovered.

It should be noted that the reinforcement structure 208 associated with the mold shells 200, 300 shown in FIGS. 2-7 is merely an example, and that a mold shell may include other reinforcement structures for receiving the strengthening agent 228. For example, with reference to FIGS. 10 and 11, a mold shell 500 is shown for use with the method 100. With reference to FIG. 10, an exterior view of the mold shell 500 is shown. The mold shell 500 may include the part forming cavity 412 of the mold shell 400 on an interior side. In this example, the mold shell 500 includes an internal reinforcement chamber 502 that is accessed via an access opening 504 defined through a mold wall 506. In this example, the internal reinforcement chamber 502 includes a lattice 508, however, the internal reinforcement chamber 502 may be open or devoid of the lattice 508. The internal reinforcement chamber 502, and optionally the lattice 508, may be additively manufactured with the manufacture of the mold shell 500. The internal reinforcement chamber 502 may be defined within the mold shell 500 to extend from a first end 510 to an opposite second end 512. The access opening 504 is defined through the mold wall 506 about at a center of the mold wall 506. The access opening 504 enables the strengthening agent 228 to be received within the internal reinforcement chamber 502. In one example, the mold wall 506 may also include one or more drain openings 514, which enable excess strengthening agent 228 to be removed from the internal reinforcement chamber 502.

Figure 11:
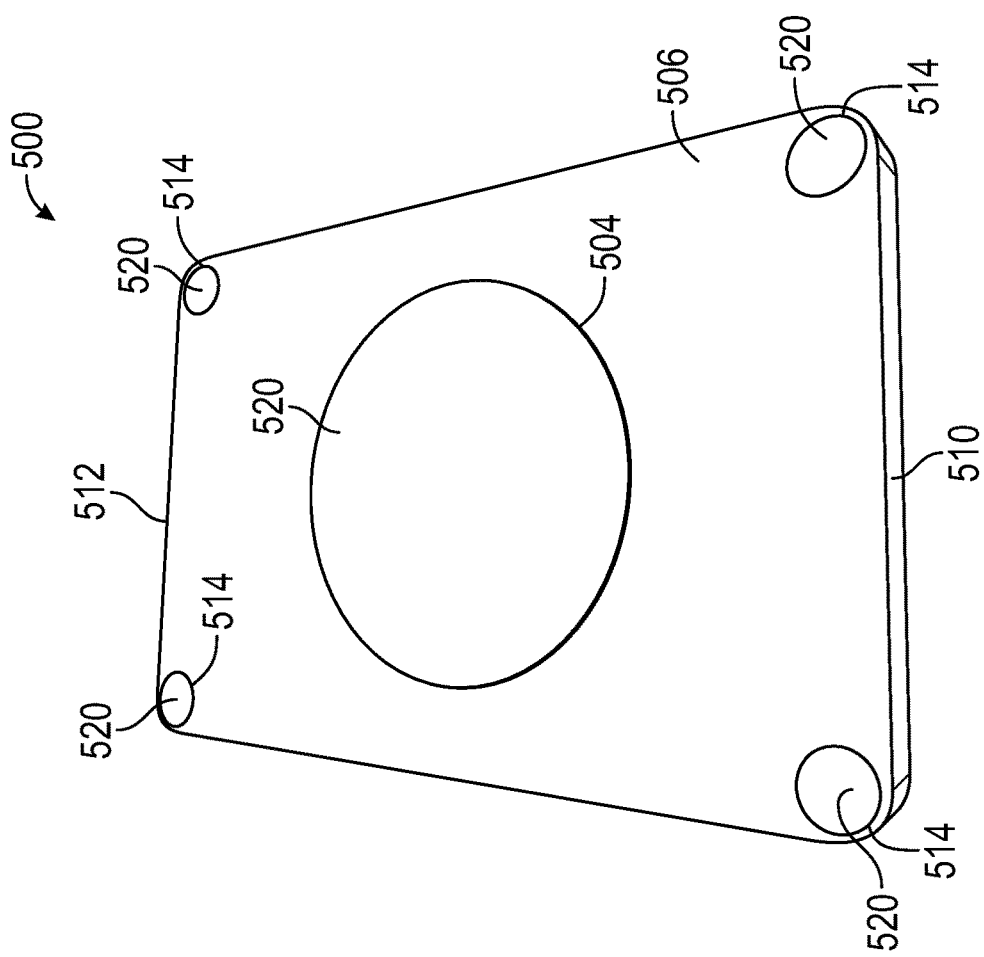
FIG. 11 is a rear perspective view of the mold shell of FIG. 10, in which the internal reinforcement chamber and the one or more drain openings are covered.

With reference to FIG. 11, once the strengthening agent 228 is received within the internal reinforcement chamber 502 or the internal reinforcement chamber 502 is filled with the strengthening agent, the access opening 504 and the drain openings 514 may be sealed with one or more additively manufactured covers 520. The covers 520 are sized to occlude the respective one of the access opening 504 and the drain openings 514 to seal the internal reinforcement chamber 502.

It should be noted that the mold shell shown in FIGS. 2-5 may be configured differently for composite molding. For example, with reference to FIGS. 12 and 13, another exemplary mold shell 600 is shown for use with the method 100. As the mold shell 600 includes components that are the same or similar to components of the mold shell 200 discussed with regard to FIGS. 2-5 and the mold shell 300 discussed with regard to FIGS. 6 and 7, the same reference numerals will be used to denote the same components. In this example, the mold shell 600 includes a first mold half 602 and a second mold half 604 that cooperate to form the composite part 700 (FIG. 15), and each of the first mold half 602 and the second mold half 604 includes the conformal system 301. Each of the first mold half 602 and a second mold half 604 is integrally formed, monolithic or one-piece with the conformal system 301. Each of the first mold half 602 and the second mold half 604 includes a plurality of mold walls 606, a reinforcement structure 608, the mold assembly structure 210, and the part forming cavity 212. In addition, although not shown, one or both of the first mold half 602 and the second mold half 604 may include a mold identification feature, including, but not limited to text, numbers, symbols, etc. One or both of the first mold half 602 and the second mold half 604 may also include instructions for lay-up of the composite material, for example.

Generally, each of the first mold half 602 and the second mold half 604 are additively manufactured at an angle, so that each of the first mold half 602 and the second mold half 604 are supported during their manufacture. In other embodiments, the first mold half 602 and/or the second mold half 604 may include additively manufactured supports to assist in supporting the first mold half 602 and/or the second mold half 604 during additive manufacturing. These additively manufactured supports may be removed from the first mold half 602 and/or the second mold half 604 upon completion of additive manufacturing via trimming, etc. Each of the first mold half 602 and the second mold half 604 has a first or exterior side 614 and the opposite second or interior side 216 (FIG. 4). Each of the first mold half 302 and the second mold half 304 has the first end 218 opposite the second end 220. It should be noted that in this example, the first mold half 602 and the second mold half 604 are substantially similar and thus, the same reference numeral will be used to discuss components that are the same and the same reference numeral with an "'" will be used to denote components that are substantially similar. In other examples, the first mold half 602 and the second mold half 604 may be different depending upon the composite part to be manufactured.

The plurality of mold walls 606 define a perimeter of each of the first mold half 602 and the second mold half 604. In one example, each of the first mold half 602 and the second mold half 604 has a substantially polygonal perimeter. Each of the mold walls 606 are planar or straight, and extend from the interior side 216 for the distance D. By extending for the distance D, the mold walls 606 cooperate to retain the strengthening agent 228 (FIG. 14), which provides each of the first mold half 602 and the second mold half 604 with temperature and pressure resistance. In one example, the mold walls 606 include a cavity wall 630, 630', the pair of endwalls 232, and the pair of sidewalls 234. The cavity wall 630 forms the interior side 216 of the first mold half 602 and the cavity wall 630' forms the interior side 216 of the second mold half 604.

Figure 13:
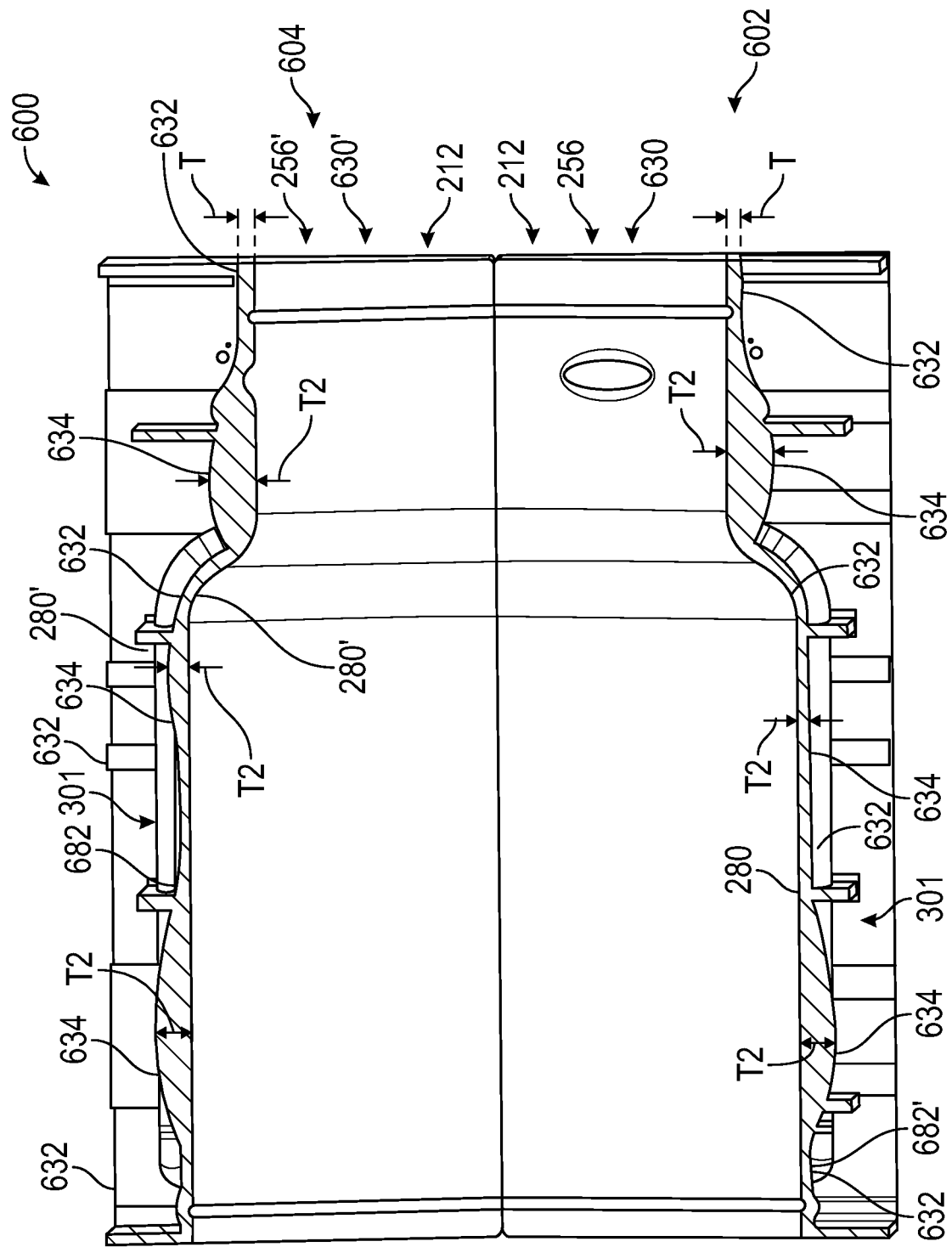
FIG. 13 is a cross-section of the assembled mold shell of FIG. 12, taken along line 13-13 of FIG. 12.

With reference to FIG. 13, each of the cavity walls 630, 630' include at least one first wall section 632 with the thickness T and at least one second wall section 634 with a second thickness T2. In this example, the cavity walls 630, 630' include three second wall sections 634, and each of the three second wall sections 634 alternate with a respective one of the first wall sections 632. It should be noted that this arrangement of the first wall sections 632 and the second wall sections 634 is merely an example, as the cavity walls 630, 630' may include any number and arrangement of second wall sections 634. Moreover, while the cavity walls 630, 630" are shown and described as having the same arrangement of the first wall sections 632 and the second wall sections 634, the cavity walls 630, 630' may each include a different number and arrangement of the first wall sections 632 and the second wall sections 634. The first wall sections 632, the endwalls 232 and the sidewalls 234 have the thickness T. The second wall sections 634 have the thickness T2, which is different and greater than the thickness T. In one example, the second thickness T2 is about 1.05 millimeters (mm) to about 5.0 millimeters (mm), and in some examples, the thickness T2 is about 1.05 millimeters (mm) to about 3.0 millimeters (mm). Generally, the second thickness T2 is different and greater than the thickness T to provide rigidity to predetermined portions of the cavity wall 630, 630' that may experience increased stress. For example, the second wall sections 634 may reinforce the cavity wall 630, 630' at predetermined locations where the thermal growth rate between the first mold half 602 and/or the second mold half 604 and the composite part 700 (FIG. 15) is different. In other examples, the second wall sections 634 may reinforce the cavity wall 630, 630' at predetermined locations where the composite part 700 (FIG. 15) is removed from the first mold half 602 and/or the second mold half 604 to provide increased rigidity during demolding. In addition, the second wall sections 634 may be defined on the cavity wall 630, 630' at predetermined locations to control an amount of heat experienced by the composite part 700 (FIG. 15). For example, the second wall section(s) 634 may be defined at predetermined locations where it is desirable for the composite part to cool slowly. Thus, the cavity walls 630, 630'' may each be defined with a varying wall thickness to provide reinforcement to the cavity walls 630, 630'' and/or to control an amount of heat experienced by the composite part 700 (FIG. 15).

In one example, with reference back to FIG. 12, the at least one reinforcement structure 608 comprises a plurality of ribs 636. Generally, each of the ribs 636 extends between the sidewalls 234 or extends substantially parallel to the endwalls 232. Each of the ribs 636 has the thickness T (FIG. 4). In one example, the ribs 636 are recessed relative to the sidewalls 234 such that the ribs 636 are not flush with the sidewalls 234. In other words, the ribs 636 are defined to extend from the cavity wall 630, 630' or the conformal system 301 to proximate a terminal surface of the sidewalls 234. This enables the strengthening agent 228 to encapsulate the ribs 636 such that the ribs 636 are internal to the strengthening agent 228 once the strengthening agent 228 is coupled to the first mold half 602 and the second mold half 604. The ribs 636 cooperate with the conformal system 301 and the cavity wall 630, 630' to define a plurality of chambers 638 to receive the strengthening agent 228. It should be noted that the use of ribs 636 is merely exemplary, as the at least one reinforcement structure 608 may comprise any support structure that cooperates with the strengthening agent 228, including, but not limited to ribs, lattice, gyroids, or other semi-dense reinforcement structure. In this example, each of the first mold half 602 and the second mold half 604 includes four ribs 636, however, the first mold half 602 and the second mold half 604 may include any number of ribs 636, and may not include the same number of ribs 636. In certain instances, the reinforcement structure 608 enables the first mold half 602 and the second mold half 604 to be additively manufactured without additive manufacturing supports.

The mold assembly structure 210 assists in forming the mold shell 600. In this example, the mold assembly structure 210 includes the fastener passages 240, 240', the fastener bores 242 (FIG. 5) and the locating structures 244 (FIG. 5). Each of the fastener passages 240 are configured to receive the mechanical fastener, including, but not limited to a bolt, etc., which cooperates with the nut, etc. disposed at an end of the respective fastener passage 240' to clamp the first mold half 602 to the second mold half 604. Each of the fastener passages 240, 240' is in communication with a respective fastener bore 242. The mold assembly structure 210 includes four locating structures 244 to assist in coupling the first mold half 602 and the second mold half 604 together, and may provide error proofing. In one example, each of the locating structures 244 includes the locating pin 246 and the pin recess 248 (FIG. 5).

The part forming cavity 212 is defined by the portion 256, 256' (FIG. 5) of the cavity wall 630, 630'. Stated another way, the cavity wall 630, 630' is formed with a shape that corresponds to the predetermined exterior shape of the composite part 700 (FIG. 15). As the part forming cavity 212 is the same between the mold shell 200 and the mold shell 600, the part forming cavity 212 and the interior side 216 will not be discussed in detail herein. In this example, the part forming cavity 212 includes the first conduit cavity 250, 250', the second conduit cavity 252, 252' and the third conduit cavity 254, 254' each of which is defined in the portion 256, 256' of the cavity wall 630, 630'. The second portion 258, 258' of the cavity wall 630, 630' forms a contact surface for the respective one of the first mold half 602 and the second mold half 604 against the other of the first mold half 602 and the second mold half 604 when the first mold half 602 is coupled to the second mold half 604.

Generally, the cavity wall 630, 630' defines the cavities 250, 250', 252, 252', 254, 254' (FIG. 5) for the manufacture of the composite part 700 (FIG. 15), and also defines the boundaries (sections 260, 262, 262', 264, 264', 266, 266') associated with the composite part 700 (FIG. 15). The cavity wall 630, 630' has the part forming cavity 212 on the first side 280, 280' (FIG. 13), and an opposite second side 682 of the cavity wall 630, 630' cooperates with the mold walls 606, the ribs 636 and the conformal system 301 to define the chambers 638 to receive the strengthening agent 228. The conformal system 301 is defined along the second side 682 of the cavity wall 630, 630'.

In this example, the conformal system 301 is the conformal tubing system, which is defined to extend in the serpentine pattern generally indicated as 384 along at least a portion of the second side 682 of the cavity wall 630, 630'. Generally, the conformal system 301 extends in the serpentine pattern 384 along the second side 682 so as to be opposite the first conduit cavity 250, 250'. The conformal system 301 also extends in the first loop 386 on the second side 382 opposite the second conduit cavity 252, 252' and the second loop 388 on the second side 382 opposite the third conduit cavity 254, 254' (FIGS. 6 and 7). Each of the serpentine pattern 384, the first loop 386 and the second loop 388 are in fluid communication. Fluid, including, but not limited to heated or cooled air, heated or cooled gas, heated or cooled non-Newtonian fluid, heated or cooled liquid, etc. may enter the conformal system 301 via the inlet 390 and flow through the serpentine pattern 384, the first loop 386 and the second loop 388 to exit via the outlet 392 (FIGS. 6 and 7). The use of a heated fluid may reduce cure time by heating the part forming cavity 212, while the use of a cooled fluid may assist in removing the part from the part forming cavity 212.

With reference back to FIG. 1, from 104 the method 100 proceeds to 106. At 106, the method 100 includes filling at least a portion of the mold shell 200, 300, 500, 600 with the strengthening agent 228. At 106, the method includes filling the lattice structure 492 with the strengthening agent 228. In one example, the method 100 at 106 includes filling the chambers 238, 338, 638 defined by the ribs 236, 336, 636 and the second side 282, 382, 682 of the cavity wall 230, 230', 330, 330', 630, 630' with the strengthening agent 228. The method 100 at 106 also includes filling the chambers 496 of the lattice structure 492 with the strengthening agent 228, or filling the internal reinforcement chamber 502 with the strengthening agent 228. In one example, the strengthening agent 228 comprises a pourable hardenable liquid, including, but not limited to an epoxy, a resin, a cast silicone, a urethane, etc. It should be noted that the strengthening agent 228 may also include additional reinforcing agents that alter thermal conductivity and/or mechanical properties of the mold shell 200, 300, 500, 600 or lattice structure 492, including, but not limited to metal, glass beads, composite fibers, etc.

Figure 14:
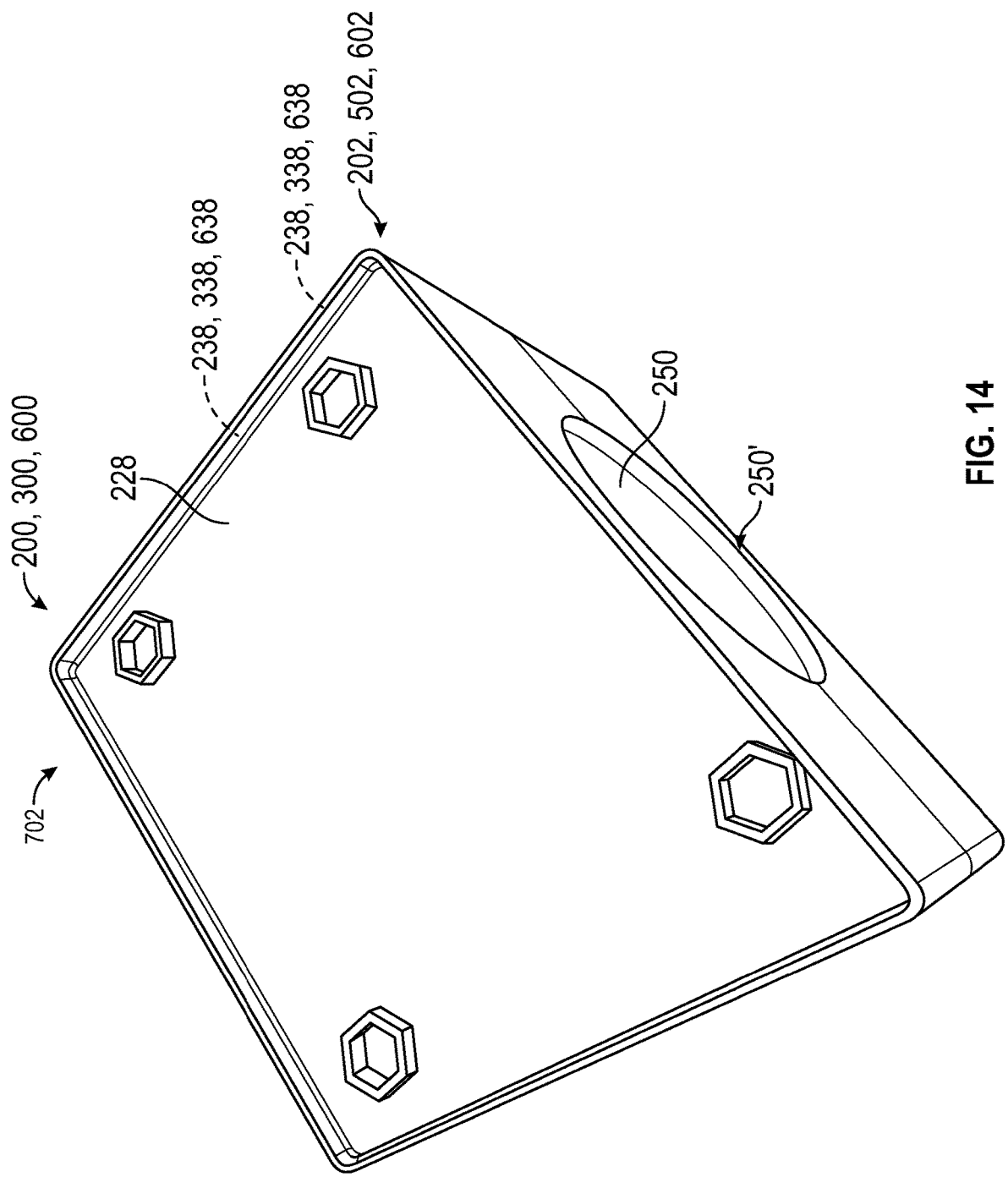
FIG. 14 is a perspective view of the exemplary assembled mold shell of FIGS. 2, 6 and 12, which includes a strengthening agent that is hardened to form an exemplary mold in accordance with various embodiments.

At 108, the method 100 includes curing or hardening the strengthening agent 228 to form a mold. Generally, the mold shell 200, 300, 400, 500, 600 with the hardened strengthening agent 228 provides a system for composite molding. The strengthening agent 228 may be cured by the passage of a predetermined amount of time, by subjecting the mold shell 200, 300, 500, 600 or lattice structure 492 with the strengthening agent 228 to a predetermined temperature and/or pressure, by subjecting the mold shell 200, 300, 500, 600 or lattice structure 492 with the strengthening agent 228 to light, etc. In the example of the mold shell 200, 300, 600 with reference to FIG. 14, the mold shell 200, 300, 600 is shown with the strengthening agent 228 cured to form a mold 702. It should be noted that the mold 702 includes the first mold half 202, 302, 602 and the second mold half 204, 304, 604 each filled with the strengthening agent 228, which has been cured or hardened. In this example, the strengthening agent 228 is a polyurethane, which is not transparent once hardened. In other examples, the strengthening agent 228 may harden to be transparent or clear, such that instructions regarding the use of the mold shell 200, 300, 500, 600 or lattice structure 492 may be printed on or positioned within the chambers 238, 338, 496, 502, 638 and visible once the strengthening agent 228 is cured. Generally, the strengthening agent 228 may harden to be transparent or clear, or may harden to a desired color. In the example of FIG. 14, the strengthening agent 228 is poured into each of the chambers 238, 338, 638 so as to extend from the second side 282, 382, 682 of the cavity wall 230, 230', 330, 330', 630, 630' to at or proximate the terminal end of the mold walls 206, 306, 606. It should be noted that in the view of FIG. 14, the first mold half 202, 302, 602 is shown with the strengthening agent 228 filling the chambers 238, 338, 638 the second mold half 204, 304, 604 is filled with the strengthening agent 228 in the same manner.

Generally, the strengthening agent 228 when hardened improves the resistance of the mold shell 200, 300, 500, 600 or lattice structure 492 to deformation caused by heat, pressure, etc. The use of the strengthening agent 228 in combination with the additively manufactured mold shell 200, 300, 500, 600 or lattice structure 492 enables the mold shell 200, 300, 500, 600 or lattice structure 492 to withstand temperatures and pressure during the composite molding, which the mold shell 200, 300, 500, 600 or lattice structure 492 without the strengthening agent 228 may not be able to withstand. Thus, the use of the mold shell 200, 300, 500, 600 or lattice structure 492 with the strengthening agent 228 provides the mold, such as the mold 702 (FIG. 14), that is substantially equivalent in performance to a metal or metal alloy mold, but the use of the mold shell 200, 300, 500, 600 or lattice structure 492 results in improved surface finish and enables hard to machine features to be formed in the composite part during molding, which thereby reduces post-processing of the composite part.

With reference back to FIG. 1, the method 100 at 110 includes laying-up the composite material within the mold shell 200, 300, 400, 500, 600. In one example, the composite material comprises any suitable polymer-based material, including, but not limited to carbon fiber, etc. In one example, layers of composite material are applied to the mold shell 200, 300, 400, 500, 600 and each layer is wetted with a resin. In one example, the composite material is pre-impregnated ("prepreg") with resin prior to placement in the mold shell 200, 300, 400, 500, 600. In addition to composite materials, any product that is manufactured in a mold may have the mold produced via blocks 104-108 of the method 100 for molding the product, including, but not limited to, sheet wood bending, injection molding, urethane or silicone castings, vacuum thermoforming, and stamping.

Once the composite material lay-up is completed, at 112, the method 100 includes assembling the mold. In the example of the mold 702 (FIG. 14) formed by the mold shells 200, 300, 600 with the strengthening agent 228, with the locating structures 244 aligned, the mechanical fastener is inserted through the fastener passages 240', through the fastener bores 242 and secured with the nut inserted through the fastener passage 240 to clamp the first mold half 202, 302, 602 to the second mold half 204, 304, 604. In the example of the mold shell 400, the second mold half 404 may be coupled to or positioned into the first mold half 402, and the lattice structure 492 may be coupled to or positioned within the second mold half 404.

At 114, the method 100 includes curing the mold, such as the mold 702 (FIG. 14), to form the composite part 700. For example, the method 100 includes positioning the mold 702 in an autoclave to cure the composite material under a predetermined pressure at a predetermined temperature. Generally, the parameters associated with the curing of the mold including the composite material at 114 is based on the type of composite material contained within the mold. In the example of a carbon fiber composite material, the mold is cured under a vacuum or autoclave pressure and the temperature is about 80 degrees Celsius (° C.) to about 175 degrees Celsius (° C.). The mold 702 may be cured by the method 100 for a predetermined period of time, such as about 1 hour to about 12 hours. A secondary post cure at a higher temperature or for a longer period of time may be performed once the composite part is demolded to achieve improved material properties, if desired.

At 116, the method 100 includes demolding and removing the composite part 700 (FIG. 15) from the mold, such as the mold 702 (FIG. 14). In the example of the mold shells 200, 300, 600 the mechanical fastener is uncoupled from the nut and removed through the fastener passages 240' and the fastener bores 242 to unclamp the first mold half 202, 302, 602 and the second mold half 204, 304, 604. In the example of the mold shell 400, the lattice structure 492 may be removed from the second mold half 404, and the second mold half 404 may be removed from the first mold half 402. With the mold disassembled, with reference to FIG. 15, the composite part 700 may be removed. FIG. 15 illustrates the exemplary composite part 700 formed using the mold shells 200, 300, 600. In this example, the composite part 700 is composed of carbon fiber, and the composite part 700 is a duct, such as a cooling duct. The composite part 700 may be removed from the first mold half 202, 302, 602.

With reference back to FIG. 1, the method 100 at 118 optionally includes finishing the composite part 700 (FIG. 15). For example, the method 100 at 118 may include trimming the composite part 700 along the trim lines formed by the trim line grooves 272. The method 100 at 118 may also include any suitable post-processing techniques used on raw composite parts such as applying one or more surface treatments to the composite part 700, including, but not limited to, sanding a portion of the composite part 700 (FIG.

15); applying a coating such as a clearcoat, a paint, or a ceramic thermal barrier; wrapping the part in thermal insulation such as gold foil, fiberglass and foil wrap, etc. The method 100 ends at 120.

Thus, the method 100 enables the formation of a composite part, such as the composite part 700 (FIG. 15) using the mold shell 200, 300, 400, 500, 600 which is additively manufactured and enhanced with the strengthening agent 228. The use of the additively manufactured mold shell 200, 300, 400, 500, 600 along with the strengthening agent 228 enables the mold shell 200, 300, 400, 500, 600 to withstand the temperature and pressure involved in curing the composite part 700 without deformation of the mold shell 200, 300, 400, 500, 600. This ensures quality of the composite part 700, and in addition, enables the use of higher temperature composite resins, which results in a composite part that can withstand greater temperatures. Stated another way, the use of the additively manufactured mold shell 200, 300, 400, 500, 600 along with the strengthening agent 228 enables the use of different composite materials, which offer various performance benefits and cure at higher temperatures. In addition, the use of the additively manufactured mold shell 200, 300, 400, 500, 600 enables the formation of hardware bosses (nut and bolt, clamping recesses, etc.), part edge lines for trimming and/or assembly, embossing or engraving lettering or graphics, surface graining and/or surface textures, features to position additional components (such as cylindrical shafts, etc.) on the composite part 700 during printing of the mold shell 200, 300, 400, 500, 600, without requiring additional processing steps on the formed composite part. Typically, multiple machine setups and/or hand operations are required to achieve the same level of detail on molds formed using metal, metal alloy or foam.

The use of the additively manufactured mold shell 200, 300, 400, 500, 600 along with the strengthening agent 228 enable the mold shell 200, 300, 400, 500, 600 to be manufactured with permanent manufacturing instructions, such as fiber lay-up direction, underneath the strengthening agent 228, which may be transparent. Generally, molds composed of metal, metal alloy or foam would require machining in text, or using non-permanent marking methods such as paint pens or markers that may require reapplication. Further, the use of the additively manufactured mold shell 200, 300, 400, 500, 600 enables the mold shell 200, 300, 400, 500, 600 to be scaled, if needed, via scaling the digital computer aided design (CAD) data used to print the part to accommodate thermal growth of the composite material. The use of the additively manufactured mold shell 200, 300, 400, 500, 600 also allows complex geometry to be included in the mold shell 200, 300, 400, 500, 600 that may be difficult to achieve with machining. The use of the additively manufactured mold shell 600 with the variable wall thickness, such as the thickness T and the second thickness T2 of the cavity walls 630, 630' accommodates areas of the mold shell 600 with different stress and thermal profiles. This variable wall thickness would also be substantially impractical to create via machining, for example.

It should be noted that the part forming cavity 212, 412 may be coated with a mold release film. In addition, first mold half 202, 302, 402, 602 the second mold half 204, 304, 404, 604 and/or the mold shell 500 may be coated with paint or a hardener to extend the life of the mold shell 200, 300, 400, 500, 600. Generally, a surface finish of the mold shell 200, 300, 400, 500, 600 is such that the mold shell 200, 300, 400, 500, 600 does not require sanding or other surface finish enhancements before the lay-up of the composite material. The use of the strengthening agent 228 also reduces the time required to form the mold shell 200, 300, 400, 500, 600 as the strengthening agent 228 enables the use of thin walls for the mold shell 200, 300, 400, 500, 600. In addition, any changes in the design of the composite part may be made by modifying the CAD data associated with the mold shell 200, 300, 400, 500, 600 and does not require reprogramming of a tooling machine, for example. Thus, the method 100 enables easy part variations without requiring retooling or reprogramming.

It should be noted that one or more sensors may be positioned adjacent to the part forming cavity 212 of the mold shell 200, 300, 400, 500, 600 without requiring the use of a conformal system, such as the conformal system 301. Rather, the one or more sensors may be positioned adjacent to the part forming cavity 212 and secured during the curing or hardening of the strengthening agent 228.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for composite molding, comprising:
   additively manufacturing a mold shell that includes a part forming cavity;
   filling at least a portion of the mold shell with a strengthening agent;
   hardening the strengthening agent to form a mold;
   laying-up a composite material on the part forming cavity; and
   curing the mold to form a composite part.

2. The method of claim 1, wherein the additively manufacturing the mold shell further comprises:
   additively manufacturing the mold shell to include at least one mold reinforcement structure that cooperates with a side of the part forming cavity to define at least one chamber for filling with the strengthening agent.

3. The method of claim 1, wherein the additively manufacturing the mold shell further comprises:
   additively manufacturing the mold shell to include a first mold half and a second mold half, each of the first mold half and the second mold half including at least one chamber.

4. The method of claim 3, wherein the filling at least the portion of the mold shell includes filling the at least one chamber associated with the first mold half with the strengthening agent and filling the at least one chamber associated with the second mold half with the strengthening agent.

5. The method of claim 3, wherein the additively manufacturing of the first mold half and the second mold half further comprises additively manufacturing at least one mold assembly structure into at least one of the first mold half and the second mold half.

6. The method of claim 1, wherein the additively manufacturing the mold shell further comprises:
   additively manufacturing the mold shell to include a conformal system proximate the part forming cavity.

7. The method of claim 6, wherein the conformal system is a conformal tube system defined on a side of the part forming cavity.

8. The method of claim 1, wherein the filling at least the portion of the mold shell with the strengthening agent further comprises filling at least the portion of the mold shell with one of an epoxy, a resin, a cast silicone, and a urethane, and the hardening the strengthening agent comprises curing the one of the epoxy, the resin, the cast silicone, and the urethane.

9. The method of claim 1, wherein the additively manufacturing the mold shell further comprises:
additively manufacturing the mold shell from a polymer-based material.

10. The method of claim 1, wherein the additively manufacturing the mold shell further comprises:
additively manufacturing the mold shell such that a cavity wall of the part forming cavity has a variable wall thickness.

11. A system for composite molding, comprising:
an additively manufactured mold shell composed of a polymer-based material that includes a part forming cavity and at least one reinforcing structure, and the at least one reinforcing structure cooperates with a side of the part forming cavity to form at least one chamber; and
a strengthening agent disposed within the at least one chamber.

12. The system of claim 11, wherein the strengthening agent is an epoxy, a resin, a cast silicone, or a urethane.

13. The system of claim 11, wherein the additively manufactured mold shell includes a conformal system defined on the side of the part forming cavity.

14. The system of claim 13, wherein the conformal system includes an inlet configured to receive a heated or a cooled fluid and an outlet configured to remove the heated or the cooled fluid from the conformal system.

15. A method for composite molding, comprising:
additively manufacturing a mold shell from a polymer-based material that includes a part forming cavity and at least one reinforcement structure, the part forming cavity including a cavity wall having a first side opposite a second side, and the second side cooperates with the at least one reinforcement structure to define at least one chamber;
filling the at least one chamber with a strengthening agent;
hardening the strengthening agent to form a mold;
laying-up a composite material on the first side of the part forming cavity; and
curing the mold to form a composite part.

16. The method of claim 15, wherein the additively manufacturing the mold shell further comprises:
additively manufacturing the mold shell to include a first mold half and a second mold half, each of the first mold half and the second mold half including the at least one chamber.

17. The method of claim 16, wherein the filling the at least one chamber includes filling the at least one chamber associated with the first mold half with the strengthening agent and filling the at least one chamber associated with the second mold half with the strengthening agent.

18. The method of claim 16, wherein the additively manufacturing of the first mold half and the second mold half further comprises additively manufacturing at least one mold assembly structure into at least one of the first mold half and the second mold half.

19. The method of claim 15, wherein the additively manufacturing the mold shell further comprises:
additively manufacturing the mold shell to include a conformal system on the second side of the cavity wall.

20. The method of claim 15, wherein the filling the at least one chamber with the strengthening agent further comprises filling the at least one chamber with one of an epoxy, a resin, a cast silicone, and a urethane, and the hardening the strengthening agent comprises curing the one of the epoxy, the resin, the cast silicone, and the urethane.

* * * * *